US006269382B1

(12) United States Patent
Cabrera et al.

(10) Patent No.: US 6,269,382 B1
(45) Date of Patent: Jul. 31, 2001

(54) SYSTEMS AND METHODS FOR MIGRATION AND RECALL OF DATA FROM LOCAL AND REMOTE STORAGE

(75) Inventors: Luis Felipe Cabrera, Bellevue, WA (US); Michael G. Lotz, Louisville, CO (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/144,409

(22) Filed: Aug. 31, 1998

(51) Int. Cl.$^7$ .................................................. G06F 17/30
(52) U.S. Cl. .................... 707/204; 707/203; 711/113; 395/620; 395/712
(58) Field of Search .................................. 707/204, 203; 711/113; 395/620, 712

(56) References Cited

U.S. PATENT DOCUMENTS

| 5,537,585 |   | 7/1996 | Blickenstaff et al. | 395/600 |
| 5,644,766 | * | 7/1997 | Coy et al. | 707/204 |
| 5,708,812 | * | 1/1998 | Dyke et al. | 395/712 |
| 5,873,103 | * | 2/1999 | Trede et al. | 707/204 |
| 5,953,729 | * | 9/1999 | Cabrera et al. | 707/204 |
| 6,023,709 | * | 2/2000 | Anglin et al. | 707/204 |
| 6,029,179 | * | 2/2000 | Kishi | 707/202 |
| 6,067,599 | * | 5/2000 | Kishi et al. | 711/113 |
| 6,119,131 | * | 9/2000 | Cabrera et al. | 707/203 |
| 6,189,016 | * | 2/2001 | Cabrera et al. | 707/203 |

OTHER PUBLICATIONS

Cabrera et al., "ADSM: A Multi–Platform, Scalable, Backup and Archive Storage System," IEEE, pp. 420–427, Mar. 5, 1995.*

Theimer et al., "QuickSilver Support for Access to Data in Large, Geographically Dispersed Systems," IBM Almaden Research Center, IEEE, p. 28–35, 1989.*

Luniewski et al., "A Design for Fine–Grained Access Control in Melampus," IEEE, pp. 185–189.*

Cabrera et al., "Implementing Atomicity in Two Systems: Techniques, Tradeoffs, and Experience," Software Engineering, IEEE Transactions On, v. 19, n. 10, pp. 950–961, Oct. 1993.*

CAE Specification, System Management: Data Storage Management (XDSM) API, published by *The Open Group*; Feb. 1997.

* cited by examiner

*Primary Examiner*—Thomas Black
*Assistant Examiner*—Charles L. Rones
(74) *Attorney, Agent, or Firm*—Workman, Nydegger & Seeley

(57) ABSTRACT

The present invention is directed to systems and methods for hierarchical storage management. A system manager specifies policies used to migrate and recall data from between the local and a remote storage while the system itself is afforded latitude in complying or violating these policies. As a violation of the migration policy, the system of the present invention pre-migrates data from local storage to remote storage prior to the time that a given file will become eligible for migration thereto. During pre-migration, data resides in both local and remote storage. Once the time for migration has arrived, local storage space may be freed by simply deleting the data stored locally and retaining the data stored remotely. As part of the recall policy, data is delayed from returning to local storage from the remote storage unless an access request or a write command specifically requires that the data be returned. Mechanisms are disclosed to detect if I/O requests that occur after data has been pre-migrated but before the data has been migrated invalidate the pre-migration.

33 Claims, 14 Drawing Sheets

SYSTEMS AND METHODS FOR MIGRATION AND RECALL OF DATA FROM LOCAL AND REMOTE STORAGE

BACKGROUND OF THE INVENTION

1. The Field of the Invention

The present invention relates to systems and methods for the hierarchical storage of data. More specifically, the present invention allows a system implementing hierarchical storage of data to migrate and recall data from between local and remote storage. Even more specifically, this invention teaches migration of data in a manner that enables rapid freeing of local storage space and teaches recall of data in a necessary-only manner to maintain the local storage space in an unencumbered fashion.

2. The Prior State of the Art

Many advances have been made in computer hardware and software, but some general principles have remained constant. For example, there continues to be a difference in the cost of storing data as a function of the medium used to store the data and the accessibility thereto. This is true despite recent advances that have lowered the costs of memory/data storage and increased the overall storage capacity of individual computing devices. In general, it is more expensive to store a data word in cache memory than in system RAM. System RAM, in turn, is more expensive per storage word than magnetic disk storage. Similarly, magnetic disk storage is more expensive per storage word than archival storage. It is thus apparent, regardless of recent advances, that motivation exists to transfer unused or less frequently used data to less expensive storage devices, provided that adequate access, access speeds, etc., are available in retrieving the data to make the transfer cost-effective.

In order to achieve cost-effectiveness, hierarchical data storage systems have been developed that are generally modeled on a mainframe-computing paradigm and include a separate, non-integrated hierarchical storage system. The hierarchical storage system typically administers the placement of units of storage, called datasets, into a hierarchy of storage devices. The hierarchy of storage devices may include a wide range of devices such as high end, high throughput magnetic disks, collections of normal disks, jukeboxes of optical disks, tape silos, and collections of tapes that are stored off-line in either local or remote storage. When deciding where these various datasets should be stored, hierarchical storage systems typically balance various considerations, such as the cost of storing the data, the time of retrieval, the frequency of access, and so forth. Typically, the most important factors are the length of time since the data was last accessed and the size of the data.

Files typically have various components such as a data portion where a user or software entity can store data, a name portion, and a flag portion that may be used for such things as controlling access to the file and for identifying various properties of the data. In prior art systems, hierarchical storage systems sometimes remove files from primary local storage and migrate them to remote storage and leave a "stub file" in their place at the local storage. Stub files typically contain information that allows the hierarchical storage system to determine where and at what time the data in the file was migrated. In general, the process of migrating data from local storage to remote storage involves identifying files that have met particular migration criteria, migrating the data from local to remote storage, deleting the data from local storage, and replacing the deleted data in the local storage with an appropriate stub file. Such prior art approaches, however, have several problems.

For example, one of the primary motivating factors for employing a hierarchical storage system is to remove data that is accessed less frequently and place it onto more cost-effective storage in order to free local storage for other data that is accessed more frequently. When removing this data, however, traditional hierarchical storage systems generally have a fixed migration policy that will migrate data from local storage to remote storage only when certain migration criteria are met. As an example, one criterion of the migration policy might indicate that if data is not accessed within a specified time frame, then the data is moved to remote storage and replaced with a stub file as previously described. In contrast, if these criteria are not met, then no migration can occur. The process of moving data from local storage to remote storage, however, can take a significant amount of time depending on the access speed of the remote storage medium and the amount of data to be moved. Typically, access speeds of the remote storage medium are several orders of magnitude slower than access speeds of the local storage medium.

Another problem encountered when migrating data only upon the meeting of certain criteria occurs when local storage space is needed to store new incoming data. Yet, hierarchical storage systems of this nature are not able to free the local storage fast enough to enable the incoming data to be captured because the data on the local storage is not yet eligible to migrate to remote storage under the policy. With this scenario, it is even likely that some incoming data would be lost. Consequently, the time it takes to migrate data from local storage to remote storage and free remote storage is too long.

Thus, if traditional hierarchical storage systems are to be used to maintain sufficient free local storage to accommodate any incoming data, the migration and freeing of data must be accomplished before the local storage space is needed. As a result, some hierarchical storage systems begin to migrate data to remote storage once the percentage of free local storage drops below a defined threshold. In this manner, a hierarchical storage system can help maintain an amount of free local storage that is anticipated to be sufficient for any local storage needs. This approach, however, creates two fundamental problems. First, it requires an individual to estimate how much local storage may be needed at any given instant in time. This, however, commonly causes storage thresholds to be set at a level larger than any anticipated need. In turn, systems are created that constantly maintain a significant amount of free storage space above that which is required. Ultimately, carrying more local storage than necessary increases expense. Second, although such estimates can sometimes be made reliably, many systems do not lend themselves to such estimates.

In order to reduce the time necessary to recover local storage space, some systems attempt to "pre-migrate" data to remote storage. Pre-migration of data entails migrating data to remote storage but not deleting (truncating) the data from the files stored locally. Sometimes, the pre-migrated data files may be marked to indicate their existence on both local and remote storage. Then, when local storage space is required, the pre-migrated data is truncated from the local files to recover local storage space.

While the pre-migration of data from local files allows fairly rapid recovery of local storage space, problems still exist. Before local files can be truncated, checks must be performed to identify whether the local file has been changed since the pre-migration occurred because this might serve to invalidate the pre-migration. Such checks can be relatively costly in terms of time because, even if such checks pass, truncation can be a fairly complex procedure that is limited to normal file system speeds. Locating pre-migrated files to truncate can also be costly in time.

What is needed to overcome the problems in the prior art is a hierarchical storage system that can free local storage with a speed that is not limited by the access speed of the remote storage medium. Furthermore, the system should reduce or eliminate the time spent in locating files to truncate and the time spent checking whether changes have occurred that preclude truncation of the file without "re-migrating" the file to remote storage. Such a system would allow much less local storage to be reserved since local storage could be freed as fast as it is needed. There does not currently exist a system for hierarchical storage that possesses these features.

Another problem with existing hierarchical storage systems is the inability to determine when changes have been made to a file that has been pre-migrated. Most hierarchical storage systems are implemented using technology that attempts to intercept file accesses that may cause the pre-migration of a file to be invalidated. Unfortunately, in many systems such intercepts are easily circumvented, either intentionally or unintentionally by a variety of mechanisms. Thus, in many instances one cannot absolutely guarantee that a file that has been pre-migrated has not been changed in a way that would invalidate the pre-migration. It would be an advance to have a hierarchical storage manager that is able to identify, with certainty, when files have been modified.

Regardless of which prior art implementation has been used to achieve migration of data from local to remote storage, for various reasons it is often necessary at a later time to recall the data to the local storage from the remote storage. The problem, however, is that when a request is received involving a particular file, prior art systems typically return the entire file to include all data and every associated file property from the remote storage to the local storage. This is despite the fact that many times the request might only be concerned with information contained in the stub file stored on the local storage. As a result, conventional systems squander valuable time when responding to requests for information relating to files because of the time required to locate the data on the remote storage and transfer or return it to the local storage.

Another problem is encountered when users merely desire to read the data of a file without writing to the file. Conventional systems will recall the entire contents of the data stored remotely and leave a copy in the local storage. This unnecessarily encumbers the local storage space with data that is simply being read.

Accordingly, it would be an advance to circumvent the recall of data to local storage from remote storage if the data of the file was not necessarily required in local storage.

SUMMARY AND OBJECTS OF THE INVENTION

The foregoing problems in the prior state of the art have been successfully overcome by the present invention, which is directed to systems and methods for hierarchical data storage. The present invention allows local storage to be freed with a faster speed than prior art systems and prevents the recall of data to the local storage from the remote storage unless the data is required for write commands or is specifically requested.

The present invention may be implemented using any number of hierarchical storage systems. One suitable hierarchical storage system uses a plurality of drivers or data managers to cooperate to fill an I/O request. The drivers or data managers may have a layered relationship where each driver or data manager is responsible for processing a particular portion of an I/O request. Information may be passed from one layer to another so that all layers cooperate to completely fill an I/O request.

Such a system uses a hierarchical storage manager or a portion of a hierarchical storage manager as one of the driver layers. The hierarchical storage manager adds an additional component or "attribute" to the files or directories of the local storage device. This attribute is used to identify files that have information that has been copied or moved to remote storage. The layered I/O system passes control to the hierarchical storage manager for processing I/O requests involving files with remotely stored information. The hierarchical storage manager then handles the processing of the I/O request, employing other drivers in the I/O system as appropriate.

In embodiments where only a portion of the hierarchical storage manager resides as one of the layered drivers, the other functionality may be incorporated in other software components executing on the system. For example, an application level component may be used to scan for files that should be migrated. Other types of hierarchical storage systems may also be utilized and the present invention is not limited to any particular hierarchical storage system.

The present invention changes the way a hierarchical storage system operates by employing a unique migration and recall policy along with specific capabilities of a hierarchical storage system The present invention employs a "pre-migration" state where data is stored simultaneously both on local storage and on remote storage. Additional capabilities are included that allow pre-migrated data to be freed from local storage much faster than traditional systems. Finally, certain embodiments may take advantage of various file system capabilities to increase the certainty that changes to pre-migrated files can be detected.

Data migration in the present invention begins with the hierarchical storage system identifying candidates that will meet a designated migration policy at an identified time in the future. The migration policy may be any traditional migration policy and may utilize any number of factors to determine when data should be migrated from local storage to remote storage. For example, files may be migrated from local storage to remote storage after the files have not been accessed for a designated period of time. Such a migration policy may also utilize size to identify which files should be migrated to remote storage. Any other factors such as file ownership may also be utilized.

Once the present invention has identified files that will meet a designated migration criteria at an identified time in the future, the system "pre-migrates" the data to remote storage prior to the time that the migration criteria would be met. The pre-migrated data is maintained both on remote storage and local storage. It is preferred that during this pre-migration state that the original data and the file remain substantially unchanged so that a user or other software entity accessing the file does not know that data in the file has been pre-migrated to remote storage. Thus, during this pre-migration state, the original file remains substantially unchanged but the data is also maintained on remote storage.

It will be appreciated that pre-migration, in addition to the act of migrating candidates that are eligible for migration at a time prior to the time specified for migration, includes the ability to violate the migration policy of the system obtained during the identification of candidates for pre-migration.

Once a file has attained the pre-migration state, the hierarchical storage system waits until the file actually meets the migration criteria. Once the file meets the designated migration criteria, then the local data need simply be deleted and the migration recorded for the migration to be complete. One embodiment uses sparse file technology to store pre-migrated files. When the time arrives to free local storage, the data to be truncated is indicated as "zero" data and the file system rapidly recovers the storage space freed by "zeroing" the data. This process can occur at speeds much faster than speeds at which normal file systems free truncated data, thus resulting in a speed advantage over traditional systems. The use of sparse file technology to recover space provides an additional advantage in that the reported file size does not change even though the file has been "truncated." This is a dramatic improvement over the traditional stub file approach as the true attributes of the file are retained in their native form with no need to provide them "on-demand" in a computed manner. Thus, once a file is in the pre-migrated state, local storage may be rapidly freed. By utilizing an aggressive pre-migration policy and pre-migrating data to remote storage ahead of the time that the data actually meets the designated migration criteria, a pool of locally stored data can be created that can be deleted very rapidly if a situation should ever arise that requires more local storage than is currently available.

When data is pre-migrated to remote storage, operations may occur that invalidate the planned migration of the data to remote storage. For example, consider a migration policy, which migrates data to remote storage when the data has not been accessed within a given time frame. The pre-migration policy may pre-migrate the data to remote storage at the three-quarter time mark In other words, the data is pre-migrated to remote storage when three-quarters of the designated time has elapsed. The data would then be maintained in the pre-migrated state, residing on both the local and remote storage, until the full migration time has expired. If during the time between the three-quarter time mark and the full migration time the file is accessed, then the file would no longer meet the migration policy when the time limit expired. In such a situation, the data that had been pre-migrated to remote storage may be invalidated and it would have been as if the data had never been pre-migrated to remote storage. In other words, if an event occurs between the time that the data has been pre-migrated to remote storage and the time that the data should be migrated to remote storage that invalidates the migration, then the pre-migration may be invalidated and the file is treated as if the pre-migration had never happened. If the access to the data does not change it, then it may be left in the pre-migrated state.

Invalidating the pre-migrated data may be as simple as deleting the data and any record of the pre-migration from remote storage, removing any record of pre-migration from local storage, or any other combination of steps that places the file into the same state that it would have been if the pre-migration had never occurred. In some hierarchical storage systems, the remote storage space may be reclaimed instantly, while in others the remote storage space may be wasted for a long period of time. This will depend upon the exact implementation of the hierarchical storage system and the type of remote storage utilized.

In one implementation, the internal workings of the NT File System (NTFS) are utilized to positively detect changes to files that have been pre-migrated. Every time a file is changed in NTFS, a new Update Sequence Number (USN) is assigned to the file. By storing the USN of the file when it is pre-migrated and comparing it to the USN of the file at the time of truncation, changes to the file that invalidate the pre-migration can be positively detected.

It is preferable, although not strictly required, to have a journaling capability built into the hierarchical storage system that saves the actions taken during the pre-migration and/or migration of the data. This will allow the hierarchical storage system to resume operation without repeating steps already completed should the pre-migration and/or migration process be interrupted prior to completion.

Additional speed advantages are obtained of maintaining lists of pre-migrated files so that potential candidates for truncation can be rapidly identified without scanning the entire file system. This capability results in a dramatic increase in speed over existing systems.

The recall policy for recalling data to the local storage from the remote storage implemented by the present invention is known as delayed or lazy and occurs only for write commands or when specifically requested by a user. In this manner, local storage space is kept unencumbered of superfluous data. An exemplary architecture describes examples for recalling data to the local storage from the remote storage. Additional conditions for restore can be deployed as easy extensions, such as recalling a file after its data has been accessed a given number of times over a given interval of time. In particular, the system may recall a file the first time that its data is accessed.

Accordingly, it is a primary object of this invention to provide a system and method for remote storage that allows local storage to be rapidly freed should the need arise to rapidly reclaim local storage. It is another object of this invention to provide a hierarchical storage system that maximizes the amount of local storage that can be transferred to remote storage It is still another object of the present invention to provide a robust hierarchical storage system that allows migrations of files to be done in a manner that poses low overhead to the system. It is still yet another object of the present invention to provide a recall policy that recalls data to the local storage from the remote storage in a necessary-only manner to maintain the local storage space in an unencumbered fashion.

Additional objects and advantages of the invention will be set forth in the description that follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for the hierarchical storage of data. The embodiments of the present invention may comprise a special purpose or general purpose computer comprising various computer hardware, as discussed in greater detail below.

Embodiments within the scope of the present invention also include computer readable media having executable instructions or data fields stored thereon. Such computer readable media can be any available media, which can be accessed by a general purpose or special purpose computer. By way of example, and not limitation, such computer readable media can comprise RAM, ROM, EEPROM, CD-ROM or other optical disk storage, magnetic disk storage or other magnetic disk storage devices, or any other medium which can be used to store the desired executable instructions or data fields and which can accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

The present invention contemplates that a hierarchy of storage devices will be available to the system. Such a hierarchy of storage devices may comprise any number or type of storage media including, but not limited to, high-end, high-throughput magnetic disks, one or more normal disks, optical disks, jukeboxes of optical disks, tape silos, and/or collections of tapes or other storage devices that are stored off-line. In general, however, the various storage devices may be partitioned into two basic categories. The first category is local storage that contains information that is locally available to the computer system. The second category is remote storage that includes any type of storage device that contains information that is not locally available to a computer system. While the line between these two categories of devices may not be well defined, in general, local storage has a relatively quick access time and is used to store frequently accessed data, while remote storage has a much longer access time and is used to store data that is accessed less frequently. The capacity of remote storage is also typically an order of magnitude larger than the capacity of local storage.

Figure 1:
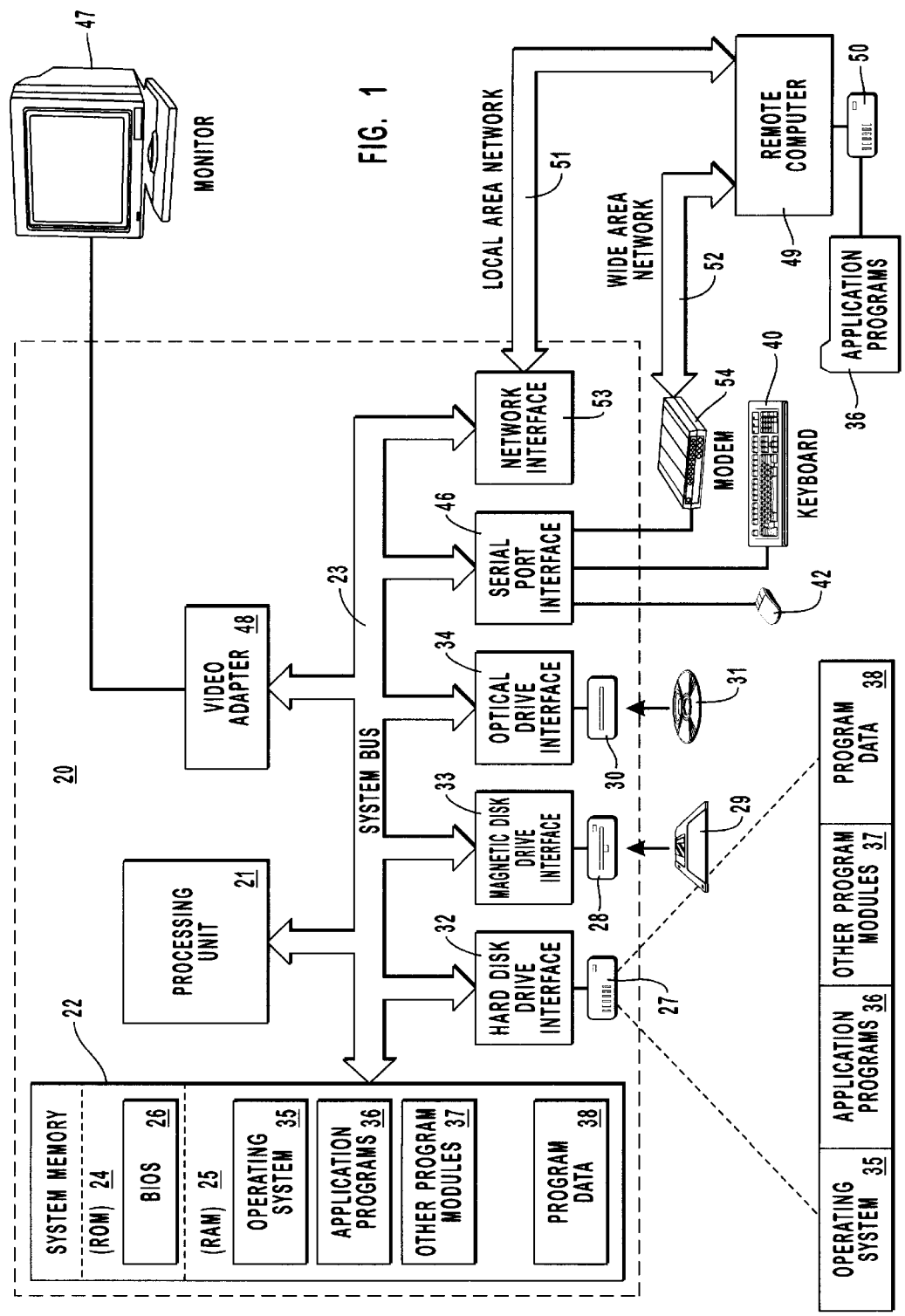
FIG. 1 is an example system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, computer clusters, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a hard disk, not shown, a magnetic disk drive 28 for reading from or writing to a removable magnetic disk 29, and an optical disk drive 30 for reading from or writing to removable optical disk 31 such as a CD-ROM or other optical media. The hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, computers typically include other peripheral output devices (not shown), such as speakers and printers.

The computer 20 may operate in a networked environment using logical connections to one or more remote computers, such as remote computer 49. Remote computer 49 may be a personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof may be stored in the remote memory storage device. It will be appreciated that the network connections shown are exemplary and other means of establishing a communications link between the computers may be used.

Figure 2:
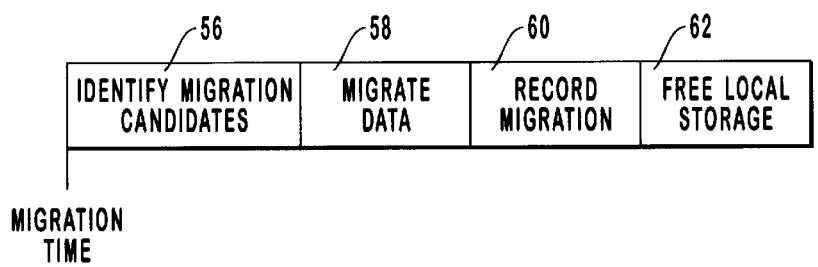
FIG. 2 is a time diagram illustrating the steps performed by a traditional prior art hierarchical storage system.

Referring next to FIG. 2, a timeline for the traditional operation of a hierarchical storage manager is presented. The timeline in FIG. 2 represents, for example, the sequence of steps that are performed by a prior art hierarchical storage system when migrating data from local storage to remote storage. As illustrated in FIG. 2, when the migration time is reached, then a traditional hierarchical storage manager will identify the files with data that should be migrated to remote storage. This is illustrated in FIG. 2 by step 56. This step can use any number of mechanisms to identify which file should be migrated from remote storage to local storage depending on the particular hierarchical storage manager. After the candidates have been identified, the next step is to migrate the appropriate data from local storage to remote storage. This is illustrated in FIG. 2 by step 58. The migration of data removes data from local storage and transfers the data to remote storage. After the data has been migrated to remote storage, the next step is to record the migration so that the hierarchical storage manager can identify files with migrated data. This is illustrated in FIG. 2 by step 60. In traditional hierarchical storage systems, step 60 may be performed by replacing local data with a stub file. In contrast, in an embodiment of the present invention described below, the step of recording migration may place appropriate information into a remote storage attribute of a file. Remote storage attributes and how they are used in embodiments of the invention are explained in greater detail subsequently. Finally, after the data migration has been recorded, the next step is to free local storage This is illustrated in FIG. 2 by step 62. The step of freeing local storage is the step of deleting from local storage any information that has been migrated to remote storage As illustrated by the timeline of FIG. 2, in a traditional hierarchical storage manager no action is taken until the migration time is reached. It should be noted that steps 56 and 58 may take a significant amount of time to perform depending on the access time of the remote storage and the amount of data to be transferred. In fact, steps 56 and 58 generally take more time than steps 60 and 62 combined.

Figure 3:
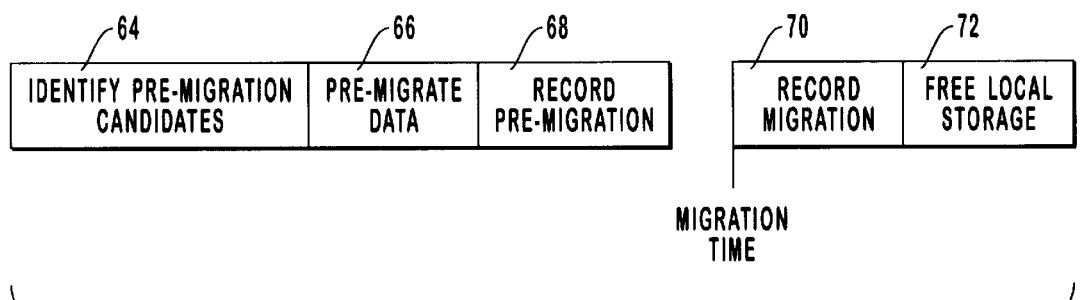
FIG. 3 is a diagram illustrating the migration steps of the present invention.

Referring next to FIG. 3, a timeline for migrating data according to the present invention is presented As indicated by FIG. 3, prior to the time that the migration criteria is met (the migration time), the present invention identifies candidates for "pre-migration." This is illustrated in FIG. 3 by step 64.

In the present invention, an example of candidates identified for pre-migration are those candidate files that are eligible for migration only at an earlier time. For example, suppose a given migration policy or criteria specified that files that were not accessed within a designated time frame are migrated to remote storage. Thus, if a particular file would meet the migration policy at time TI, then the file would be identified as a candidate for pre-migration prior to time $T_1$. In addition, as explained more fully below, the data of the file would actually be pre-migrated to remote storage prior to time $T_1$. Actually identifying candidates for migration to remote storage from local storage is performed as a function of parameters collected or solicited from a system manager/administrator. These parameters ultimately establish or set the migration policy for the system.

Preferred parameters exemplary include: (1) a minimum size that a file must have before being eligible to migrate from the local to the remote storage; (2) a minimum period of time to have elapsed without a file having been accessed before being eligible to migrate; (3) a desired percentage or level of occupancy available in the local or remote storage; and (4) a list of files, directories, owners of file, etc., that are excempt from the migration policy.

After pre-migration candidates have been identified, then the next step is to pre-migrate the data from the local storage to the remote storage. This is illustrated in FIG. 3 by step 66.

As described herein, pre-migration of data involves a unique state not encountered by prior art hierarchical storage managers. In particular, pre-migration, in addition to the act IX of migrating candidates that are eligible for migration at a time prior to the time specified for migration, includes the ability to violate, in one or more ways, the migration policy of the system as specified by the parameters solicited from the system manager.

For example, the present invention enables the system to examine the size of a file, and if that size is smaller than the size specified by the system manager, pre-migrate the file from local storage to remote storage if the migration of a smaller-than-specified file could be justified. Such justification might include the introduction of additional storage space into the local storage. This migration violates the exemplary parameter number 1 of the migration policy above.

Another example of violating the migration policy includes empowering the system to anticipate parameters and pre-migrate files that do not yet meet the specified parameters such as by anticipating the minimum period of time to have elapsed without a file having been accessed.

As another example, the system is empowered to pre-migrate files even if such migration will drop the percentage or level of occupancy available in the storage below the desired occupancy. Again, this is in violation of the migration policy.

By allowing these violations of the migration policy, the system is able to exploit the freedom of having few restraints. Ultimately, the system structure is improved because the results sought by the migration policy are flexible to achieve the desired policies and not rigidly imposed, as in the prior art, which often results in under-achievement of the desired policies.

Pre-migration preferably refers to copying data to remote storage before the time that. the migration criteria would be met. In addition, pre-migration may also refer to a state where the data is maintained both locally and remotely. In other words, data is copied from local storage to remote storage during the pre-migration phase. However, rather than deleting the data from local storage, the data is maintained intact on local storage so that the data resides both on local storage and on remote storage. It is preferable that when the data is pre-migrated from local storage to remote storage that the file on local storage remain substantially unchanged. In this context, substantially unchanged means that the data stored locally can be accessed by a user or other software entity locally without the need to retrieve the information from remote storage. It is preferable that the data be able to be accessed with little or no degradation in performance. As explained in greater detail below, most embodiments will require some change to the file or, at a minimum, the ability to track the fact that a file has changed from a locally stored file to a pre-migrated file. Such a change can be tracked via a migration state as explained hereafter.

After the data has been pre-migrated to remote storage, the next step is to record the pre-migration. This is indicated in FIG. 3 by step 68. The process of recording the pre-migration of the data will depend upon the exact implementation of the hierarchical storage manager. Essentially, this step is designed to record an indication that a file has changed from a locally stored file to a pre-migrated file. When a file is in the pre-migrated state, this is an indication to the hierarchical storage system that information in the file has been pre-migrated to remote storage. Any mechanism sufficient to indicate such a change to the hierarchical storage system can be used for this step.

After the pre-migration is recorded, nothing happens until the migration time for the file arrives. Because the data has been pre-migrated, when the migration time arrives, the data that is to be migrated has already been moved to remote storage. Thus, all that remains is for the migration to be recorded and for the data stored locally to be deleted. These two steps are indicated in FIG. 3 as steps 70 and 72, respectively. At this point, the data has been fully migrated to remote storage, Step 70 of recording the migration can be accomplished in any manner sufficient to indicate to the hierarchical storage system that the data has now been fully migrated to remote storage. In certain embodiments, it may be desirable to track such a migration by keeping a migration state which can be changed from pre-migrated to migrated when the data is fully migrated.

A comparison of the sequence of events in FIG. 2 and FIG. 3 will reveal several advantages of the present invention over traditional hierarchical storage managers. As previously explained, the steps of identifying candidates for migration and the actual copying of data from local storage to remote storage consume the largest amount of time during the migration process. By performing these steps prior to the time that migration should occur, the length of time to free local storage once the migration time arrives is substantially reduced. In addition, the steps can be performed at a much lower priority and with much lower impact on running processes since there is no rush to complete them. As illustrated in FIG. 3, it does not matter when steps 64, 66, and 68 are completed as long as they are finished before the migration time arrives, Another advantage of the present invention may be illustrated by reference to a particular example. Suppose that data was arriving that must be stored on local storage. Further assume that the local storage did not have sufficient free space to store the data as it arrives As previously explained, in such a situation traditional hierarchical storage managers operating according to the timeline of FIG. 2 would not be able to free local storage quick enough to accommodate the data as it arrives. In the case of the present invention, however, the time to free local storage for pre-migrated data is virtually as fast as the local storage can be accessed. Thus, as data arrives it can be stored on local storage by rapidly freeing an appropriate amount of local storage space.

When freeing local storage space in order to accommodate incoming data, the present invention may begin by freeing any local storage allocated to pre-migrated files that have already met the criteria for migration. If, however, sufficient local storage space is not freed by deleting pre-migrated files that have already met the migration criteria, then the present invention provides an extra degree of flexibility not available to prior art systems. The present invention can choose to delete data in pre-migrated files that have not yet satisfied the migration criteria. Although such a step is in violation of the migration policy, i.e., violation of the time specified since its last access, the step is safe because the information that is deleted locally has already been saved remotely. Thus, the data is available to the system, although it may need to be recalled from remote storage before it can be directly accessed. The result is that, for some or many files, the strict migration policy may be violated since files are effectively migrated prior to the time that they meet the migration criteria However, sufficient local storage space has been freed to prevent any loss of service to store incoming data.

Figure 4:
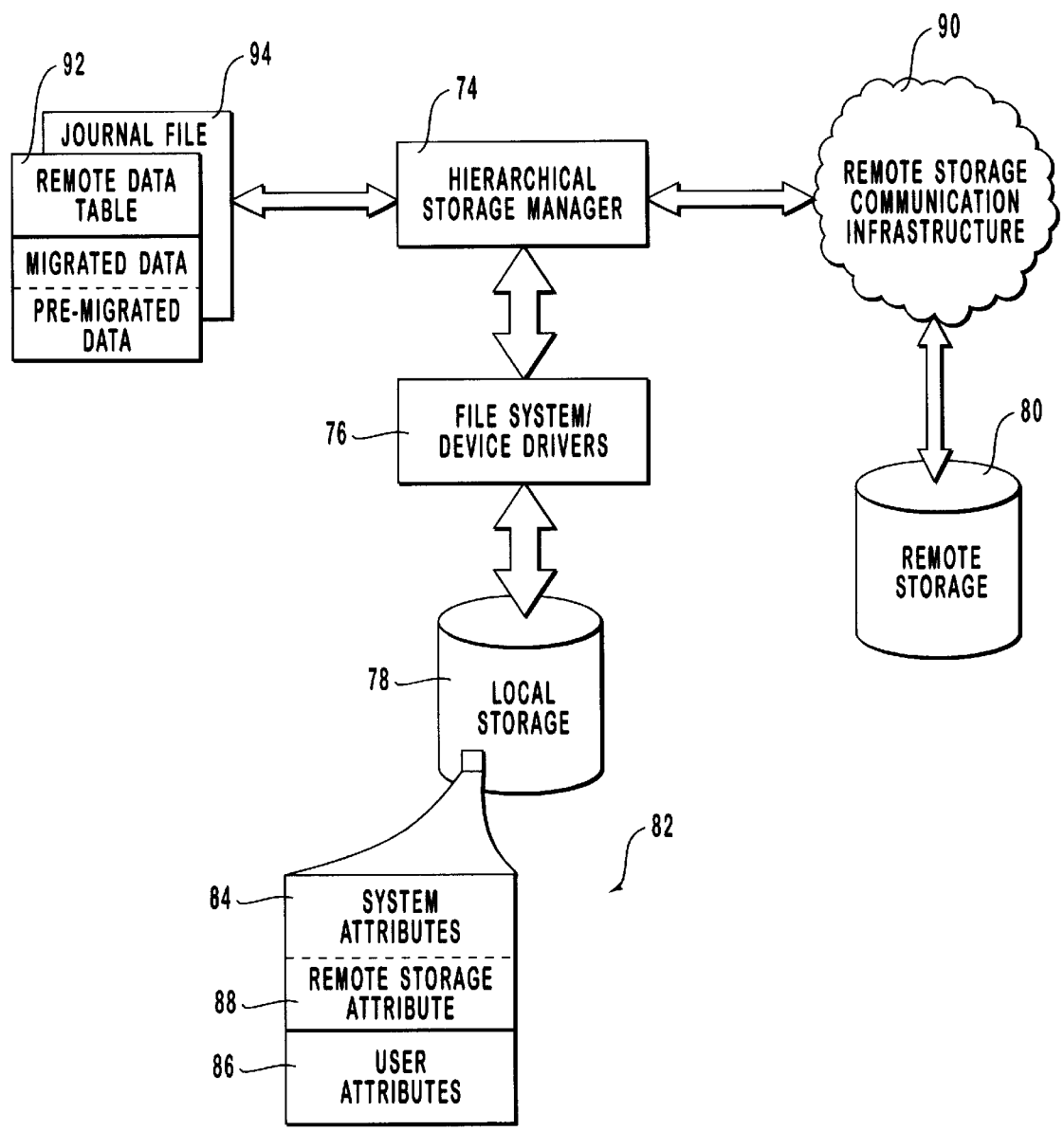
FIG. 4 is a top-level diagram of one embodiment of the present invention.

The above example also illustrates yet another benefit of the present invention. Because local storage can be rapidly freed by deleting pre-migrated data from local storage, full migration of data can be delayed In other words, in some embodiments it may be desirable or possible to delay migration of files that have already met the migration criteria. Since there is no need to maintain a large amount of free space on local storage to accommodate any short-term demands, data in pre-migrated files may remain locally until such time that it needs to be freed in order to meet demand for local storage space. Again, this is in violation of the migration policy of the system as specified by the parameters collected from the system manager, Turning next to FIG. 4, a top-level diagram of one embodiment of the invention is presented. In the embodiment illustrated in FIG. 4, a plurality of driver means for processing I/O requests are used. Although this embodiment illustrates a plurality of driver means, embodiments of the present invention may also use a single, monolithic driver means or other structures to implement the functions of the present invention. In FIG. 4, the plurality of driver means are represented by hierarchical storage manager 74 and file system/device drivers 76. In FIG. 4, file system/device drivers 76 are responsible for communicating information to and from local storage 78. Hierarchical storage manager 74 is responsible for coordinating processing of I/O requests involving files with remotely stored attributes. In addition, hierarchical storage manager 74 is responsible for performing pre-migration and migration of data to remote storage 80 in accordance with the present invention. Finally, hierarchical storage manager 74 is responsible for identifying files that should be pre-migrated or migrated to remote storage in accordance with the migration policy, or in violation of the migration policy, as specified by the parameters solicited from the system manager. As will be described subsequently in relation to the recall policy, the hierarchical storage manager is also responsible for recalling information to local storage from remote storage when appropriate.

The embodiment illustrated in FIG. 4 may employ the file structure of FIG. 7 discussed below. A simplified version of the file structure is illustrated by file 82, which has system attributes 84 and user attributes 86. As part of system attributes 84, file 82 includes remote storage attribute 88. System attributes, user attributes, and remote storage attributes are discussed in greater detail below In operation, hierarchical storage manager 74 will identify file(s) on local storage 78 that are candidates to have data pre-migrated to remote storage 80. Prior to the time that the files will meet a designated migration criteria, hierarchical storage manager 74 will pre-migrate data from local storage 78 to remote storage 80. As illustrated in FIG. 4, hierarchical storage manager 74 communicates with remote storage 80 via remote storage communication infrastructure 90. Remote storage communication infrastructure 90 can be any mechanism by which hierarchical storage manager 74 communicates with remote storage 80. For example, remote storage communication infrastructure 90 may include various driver means, networks, computer systems, special purpose devices, and the like.

In accordance with the steps identified in FIG. 3, after data has been pre-migrated to remote storage 80, the pre-migration is recorded. In FIG. 4, hierarchical storage manager 74 may record such pre-migration in remote data table 92. Remote data table 92 is simply a location where hierarchical storage manager 74 can store a record of files that have been pre-migrated and migrated to remote storage 80. As explained in greater detail below, remote storage attribute 88 may contain a pointer or index into remote data table 92 in order to associate an entry with a particular file. In addition, remote data table 92 may be stored on local storage 78 in order to make remote data table 92 persistent.

As data is pre-migrated or migrated from local storage 78 to remote storage 80, hierarchical storage manager 74 may journal its actions in a journal file, such as journal file 94. A journaling action in journal file 94 provides a degree of robustness for pre-migration and migration of data. If the process of pre-migration or migration of data is interrupted prior to its completion, journal file 94 will allow hierarchical storage manager 74 to resume transfer of pre-migrated or migrated data without the need to redo transfers or other steps that were already complete.

Figure 5:
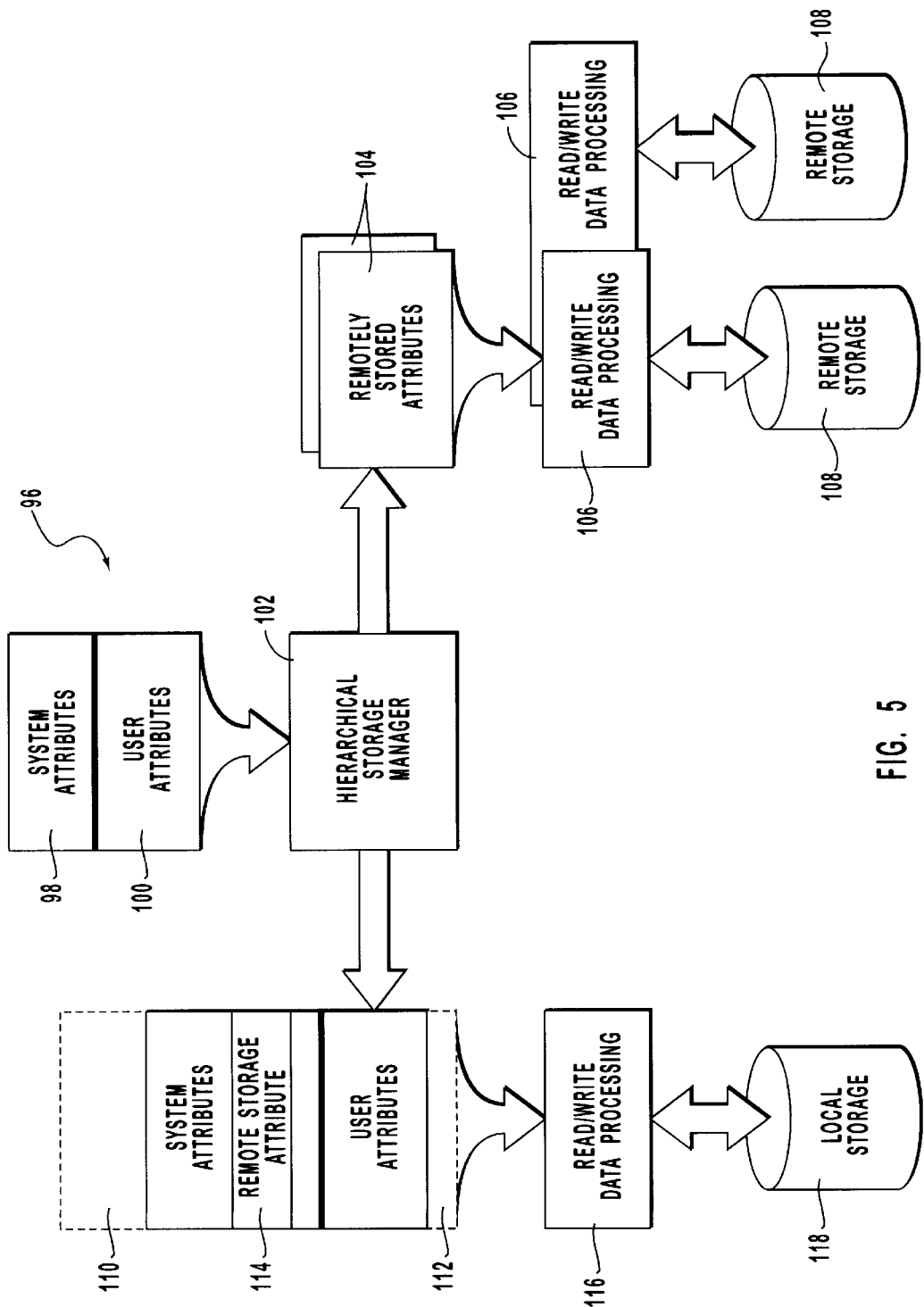
FIG. 5 is a diagram illustrating the process of storing attributes remotely.
Figure 6:
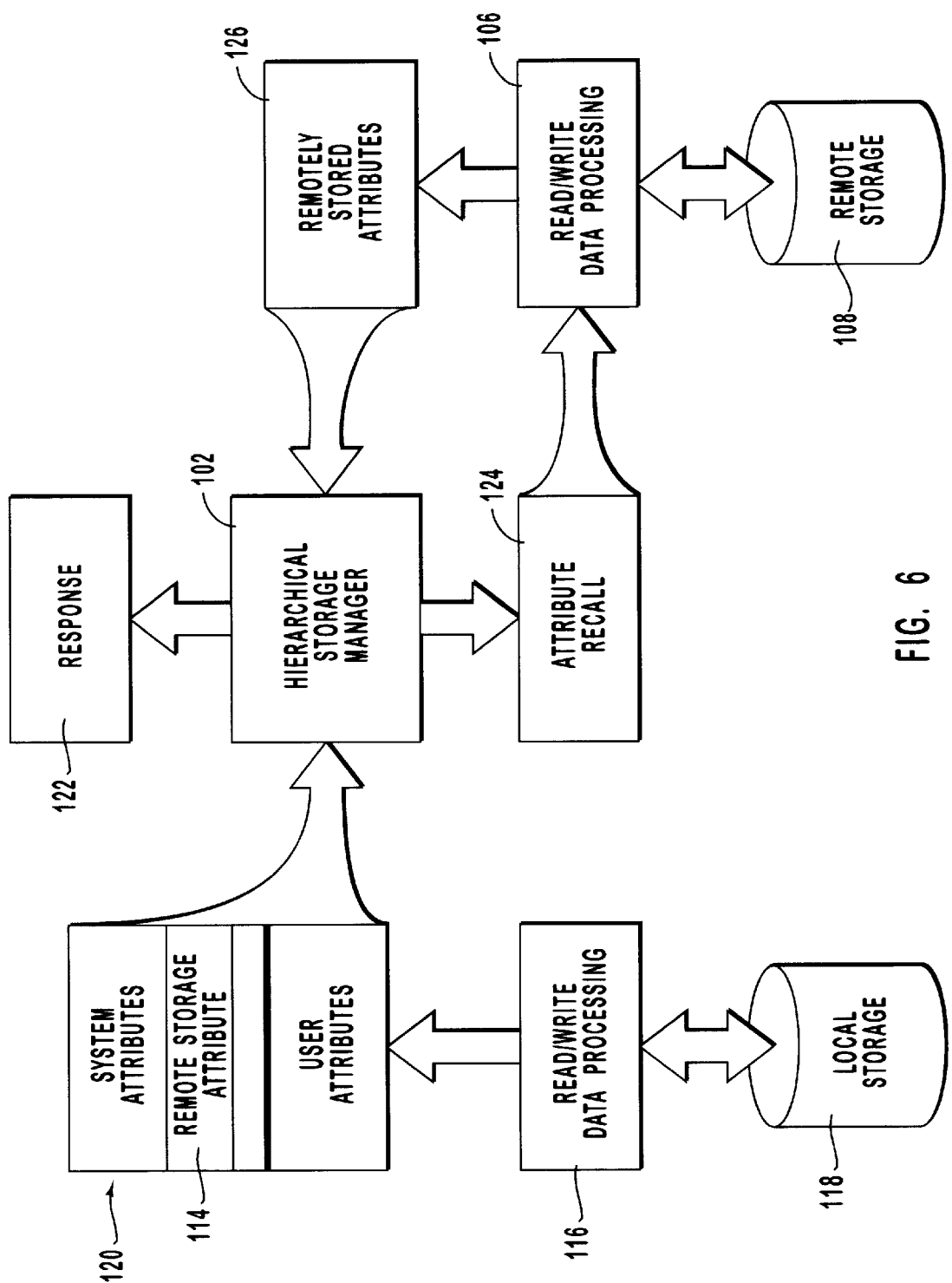
FIG. 6 is a diagram illustrating the processing of an I/O request involving remotely stored attributes.

Since a hierarchical storage manager implemented according to the present invention performs many functions, FIGS. 5 and 6 present some of these functions in greater detail using top level conceptual diagrams. Referring first to FIG. 5, a generalized diagram of the process of remotely storing some attributes of a file and locally storing other attributes of a file is presented. The information below is equally applicable to pre-migration or to migration, with appropriate modification. As explained in greater detail below, files may comprise a plurality of attributes. The present invention may be used to store any or all of the attributes of a file remotely. Thus, for any given file, some attributes may be stored locally and other attributes may be stored remotely. Of course, when a file is in the pre-migrated state, they may be stored both locally and remotely. When a file is in the fully migrated state, the only information that must remain locally is sufficient information to identify which attributes are stored remotely and where the remotely stored attributes can be found. As illustrated in FIG. 5, a file, illustrated generally as 96, may comprise system attributes 98 and user attributes 100. As discussed in greater detail below, system attributes are those attributes used primarily or exclusively by the operating system and I/O system to store information necessary or useful to allow the operating system and I/O system to perform their various tasks. An example of a system attribute would be the security or access control information for a file or directory. User attributes are attributes that are used by a user or other client process for its own purposes. The data of a file is a good example of a user attribute. System attributes and user attributes are discussed in greater detail below.

Examining file 96 is the hierarchical storage manager 102. Again, hierarchical storage manager 102 is responsible for deciding which attributes of file 96 should be stored remotely, and where the remotely stored attributes will be stored. Hierarchical storage manager 102 is also responsible for determining when the attributes should be sent to remote storage. In other words, hierarchical storage manager 102 is responsible for pre-migration and migration of data. In making these decisions, hierarchical storage manager 102 may use a designated pre-migration policy and a designated migration policy, each of which may consider numerous factors. Such factors, as described in detail below, may include: the frequency with which the file or attributes have been accessed; the size of the file or attributes; the time period elapsed since the last access of the file or attributes; the desired level of occupancy available in storage; and a compilation of files, directories, attributes, etc., that are excepted from the migration policy. It will be appreciated, in addition to the foregoing policies, that the ability to violate the migration policies of the system, as described previously, may also be used by the hierarchical storage manager in making decisions regarding migration of data from local to remote storage.

In general, data which is accessed very infrequently may be moved to remote storage on the theory that if the data has not been accessed in a long time, then it is unlikely that it will be accessed anytime in the near future. Size is another factor that may be considered by hierarchical storage manager 102, If an attribute consumes very little local storage space, then not much is gained by moving the attribute to remote storage. On the other hand, if an attribute consumes a large amount of local storage space, then moving the attribute to remote storage frees up a large amount of local storage and such a move may be valuable if local storage space is at a premium.

Numerous other factors may also come into play in deciding which attributes to store remotely and where to store the attributes. Such factors may include, for example, the time to access the remote storage medium. For example, access time may not be increased significantly if an attribute is moved from local storage to an optical jukebox. Perhaps the time necessary to select and load the proper optical disk and retrieve the information therefrom would not be significant, On the other hand, if an attribute was moved to off-line tape storage, which had to be retrieved and manually loaded by an operator, then the retrieval time may be significant. In general, when deciding which attributes to store remotely and where such attributes should be stored, hierarchical storage manager 102 will optimize different parameters such as the overall cost effectiveness of storage as well as the response time of I/O for different classes of applications. The exact methodology utilized to select which attributes are stored remotely and where such attributes are to be stored is not defined by this invention. This invention can be used to achieve whatever remote storage goals are desired.

It will be appreciated however, that the methodology used to implement this invention may also select attributes for remote storage in violation of the migration or pre-migration policy as described with reference to FIG. 3.

Embodiments within the scope of this invention may implement the general processing described in conjunction with hierarchical storage manager 102 in a variety of ways. As described in greater detail below, the functions of hierarchical storage manager 102 may be implemented by one or more driver means for performing I/O processing. Such driver means may be separate from any other driver means in an I/O system. In the alternative, the functions of hierarchical storage manager 102 may be incorporated into a multipurpose or monolithic driver means used in the I/O system.

After hierarchical storage manager 102 determines when and which attributes of file 96 should be stored remotely and where such attributes are to be stored, hierarchical storage manager 102 assembles the attributes into an appropriate format and initiates steps to transfer the attributes to remote storage. In FIG. 5, this procedure is illustrated generally by remotely stored attributes 104, read/write data processing blocks 106, and remote storage 108. A plurality of remotely stored attributes 104, read/write data processing blocks 106 and remote storage 108 is illustrated to emphasize that remotely stored attributes from a particular file need not be stored in the same location or even on the same type of remote storage device. In FIG. 5, each block labeled 104 may contain one or more attributes that are to be stored remotely.

Remotely stored attributes 104, read/write data processing blocks 106 and remote storage 108 illustrate a conceptual data flow path which simply requires the appropriate data to be transferred and stored on the appropriate remote storage device using whatever mechanisms exist to access the particular remote storage device. This data flow path may include a remote storage communication infrastructure such as that illustrated in FIG. 4. As will be illustrated by more detailed examples below, read/write data processing block 106 may be implemented using a single driver means for performing I/O processing, if the corresponding remote storage device is directly accessible by the system where hierarchical storage manager 102 resides, or may be several driver means for performing I/O processing running on multiple computers across networks or other means for communicating between multiple computer systems. All that is required is that the appropriate data be passed and stored on the appropriate remote storage device. In general, the mechanism used to implement read/write data processing block 106 will depend, in large measure, upon the specific operating environment used to implement the present invention and upon the particular hardware and/or software needed to provide a data flow path between remote storage device 108 and the system where hierarchical storage manager 102 resides.

After hierarchical storage manager 102 determines which attributes are to be stored remotely and assembles the attributes in an appropriate data format, such as remotely stored attributes 104, the attributes may be safely removed from file 96 if migration is occurring or may be maintained as part of file 96 if the data is being pre-migrated. The location of remotely stored attributes 104 is illustrated in FIG. 5 by dashed areas 110 and 112, which illustrate that both system attributes and user attributes may be stored remotely in accordance with the present invention. In addition, hierarchical storage manager 102 adds remote storage attribute 114 to the system attributes of file 96.

Although remote storage attribute 114 is discussed in greater detail below, remote storage attribute 114 is generally used to store whatever information is needed by hierarchical storage manager 102 to identify where remotely stored attributes 104 are located. In addition, remote storage attribute 114 may contain a wide variety of other information, depending upon the particular implementation of hierarchical storage manager 102. For example, it may be desirable to store which attributes are stored remotely in remote storage attribute 104. In the alternative, perhaps file 96 is structured in such a way that the identity of which attributes are stored remotely can be determined through other mechanisms. Similarly, other information may also be stored in remote storage attribute 114 For example, perhaps hierarchical storage manager 102 does not entirely trust the integrity of data stored in remote storage 108. In such a case, hierarchical storage manager 102 may calculate a digital fingerprint or signature on the remotely stored attributes and save the fingerprint or signature in remote storage attribute 114. Then when the remote attributes are retrieved, a second signature may be calculated on the remote attributes and the calculated signature compared to the signature stored in remote storage attribute 114. Such a procedure would allow hierarchical storage manager 102 to detect any changes made to remotely stored attributes as they were retrieved from remote storage 102.

As is apparent from the above discussion, any number or type of data needed or desired by hierarchical storage manager 102 can be stored in remote storage attribute 114. Remote storage attribute 114 may form an inherent part of the state of file 96 that is tracked by the I/O system and managed in an integral fashion just like all other attributes of the file. This means that the file system can detect, track, manipulate, or otherwise operate on the remote storage attribute just like any other attribute in the file. Thus, utilities dealing with the files can now incorporate functionality to operate specifically on the remote storage attribute. For example, a directory listing could examine remote storage attribute 114 and identify the percentage of local storage space and the percentage of remote storage space occupied by all available files. In addition, utilities could be developed that would estimate the retrieval time necessary to access certain remotely stored data. Such a utility would allow a system manager to fine-tune or modify the operation of hierarchical storage manager 102 based on changing conditions or other criteria. Note that all this information may be compiled simply by examining the information stored locally.

Remote storage attribute 114 is shown in FIG. 5 as being added to the system attributes portion of file 96. It is anticipated that remote storage attribute 114 will be protected from user modification for reasons that will become more apparent hereafter. Since remote storage attribute 114 is used to store information needed by hierarchical storage manager 102 to perform its various function, it should be protected from user modification and interference. It is, however, anticipated that at least part of the information stored in remote storage attribute 114 may occasionally be of interest to a user or other client process. In appropriate situations, such information may be made available to the user or client process. In rare circumstances it may be necessary to allow specialized client processes, such as utilities designed for system manager use, to be able to modify the information in remote storage attribute 114. Such occasional access by a specialized utility should not be construed as placing remote storage attribute 114 outside of the system attributes group. The primary use for remote storage attribute 114 is by the I/O system itself to accomplish the remote storage function and to integrate the remote storage functionality of the present invention into the file system itself Once remote storage attribute 114 is added to the file and the remotely stored attributes are removed from the file, the file may then be stored on local storage. This process is illustrated in FIG. 5 by read/write data processing block 116 and local storage 118. Read/write processing block 116 and local storage 118 are intended to represent a conceptual data flow path from hierarchical storage manager 102 to local storage 118. The exact implementation details will be dependent upon the particular operating environment selected to implement the present invention. As explained in greater detail below, read/write data processing block 116 may be implemented by a separate driver means for performing I/O processing or may be bundled with hierarchical storage manager 102 into a larger, more monolithic, driver means for performing I/O processing.

The example presented in FIG. 5 illustrates a particular file being examined by hierarchical storage manager 102 and decisions being made about which attributes to store locally and which attributes to store remotely and where the remotely stored attributes should be located. Note that such a procedure may be accomplished through whatever mechanism is appropriate for the system. For example, a utility could be scheduled to run periodically to examine local storage 11 8 for information that should be migrated to remote storage. Alternatively, the system may be set to examine each file as it is accessed. As yet another example, perhaps such a procedure is initiated only at the request of a user or a system manager. As explained in greater detail below, it is preferred that such a procedure run with sufficient frequency to identify which files have data that will soon become eligible for migration to remote storage.

Although the above discussion has specifically addressed how the present invention operates with respect to a file, the concepts of the present invention may be used with any locally stored entity that has a collection of attributes designed exclusively or primarily for use by the system. Thus, the example of files should be taken as exemplary in all respects and not as limiting the scope of this invention to any particular entity.

Referring now to FIG. 6, a top level block diagram illustrating the processing of I/O requests involving files with remotely stored attributes is illustrated. This figure has particular applicability to processing I/O requests for files in the migrated state (e.g., they have at least one attribute stored only on remote storage). Processing of files in the pre-migrated state is discussed below. In the context of this invention, an I/O request is any operation that may be performed by an I/O system that implements the present invention. Thus, the definition of I/O request goes far beyond the mere reading data from and writing to files. In some situations, an I/O request may trigger other actions not associated with traditional I/O operations, such as calling a phone number when a particular file is accessed. Within the context of this invention, the term is intended to be interpreted broadly When an I/O request involves a file or other entity that has remotely stored attributes, read/write data processing block 116 will be able to identify that remotely stored attributes are involved. This is because of the presence of remote storage attribute 114 When such an attribute is detected, information in remote storage attribute 114 may be passed to hierarchical storage manager 102. Hierarchical storage manager 102 may then determine what needs to be done to process the I/O request. Various embodiments may pass various types of information to hierarchical storage manager 102. For example, just the information in remote storage attribute 114 may be passed to hierarchical storage manager 102. Then, if hierarchical storage manager 102 needs other information from local storage 118, hierarchical storage manager 102 may request that read/write data processing block 116 retrieve the desired information. Alternatively, more information may be initially passed to hierarchical storage manager 102. Such details are considered to be design choices that are not critical to the present invention. In FIG. 6, the process of passing information retrieved from local storage 118 to hierarchical storage manager 102 is illustrated by file 120, which is passed to hierarchical storage manager 102.

Once hierarchical storage manager 102 receives remote storage attribute 114 and any other required information, hierarchical storage manager 102 can determine whether the I/O request can be processed using the information stored locally or whether processing the I/O request requires information to be retrieved from remote storage 108. The question as to whether the I/O request can be processed without retrieving information from remote storage 108 will depend upon the particular I/O request and the attributes that have been stored remotely.

As a particular example, consider an I/O system that implements content indexing of information accessible to the system. In such a system a user may retrieve information not by their particular address on the local or remote storage device but by key words or other content information. For example, a user may request all documents authored by a certain individual or all documents pertaining to a particular topic or all documents having a particular word or phrase. Such a content indexing scheme would require that information be examined and various content keys be stored It may be possible, in some implementations, to store the content keys as an attribute of one or more files. Then, even if the data of the file is stored remotely, the content keys may be kept locally. In such a situation, when a user requests a listing of all files containing a certain content key, this request may be filled simply by reading information from local storage 118 if the content keys are kept locally. In such a situation, hierarchical storage manager 102 would simply examine appropriate information on local storage 1 18 and generate an appropriate response, such as that illustrated by response 122.

If, however, a user wishes to access information that is stored remotely, then such information needs to be retrieved from remote storage 108. In such a situation, hierarchical storage manager 102 may initiate steps to retrieve the required information. This is illustrated in FIG. 6 by attribute recall 124. In FIG. 6, attribute recall 124 is shown as being processed by read/write data processing block 106. If remote storage 108 is accessible by read/write data processing block 106 without operator intervention, then read/write data processing block 106 may simply retrieve the requested attributes from remote storage 108 and return them to hierarchical storage manager 102, as illustrated by remotely stored attributes 126. If, however, operator intervention is required, then perhaps read/write data processing block 106, or another processing block, may need to alert an operator to load or otherwise make accessible the appropriate remote storage medium needed to retrieve the required information. Then, once the appropriate medium is available, the required information can be retrieved and returned to hierarchical storage manager 102. In either case, an appropriate response, as for example response 122, can be returned. Further examples of recall are described in relation to FIGS. 14 and 15.

Figure 7:
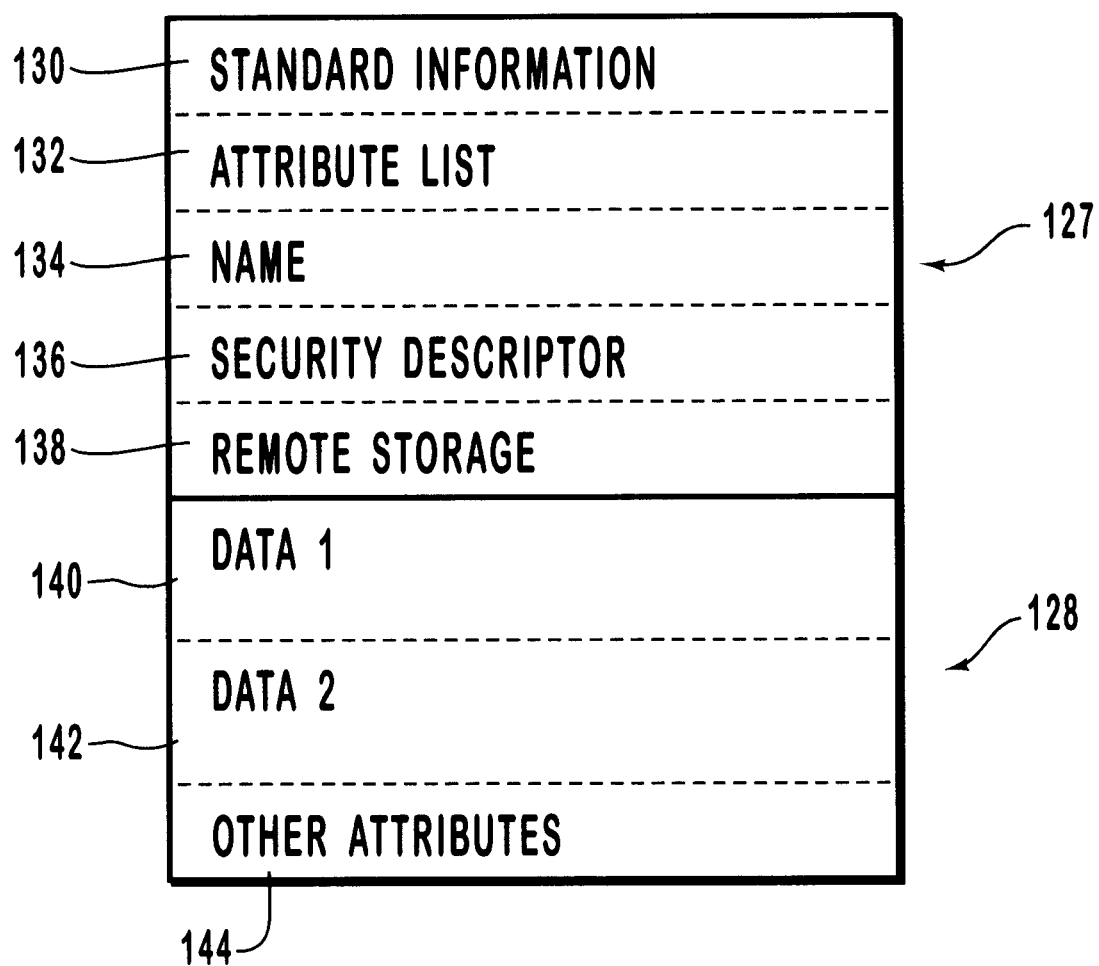
FIG. 7 is a diagram illustrating the attributes of a file suitable for use with the present invention.

Referring next to FIG. 7, a pictorial diagram of attributes of a file suitable for use with the present invention is illustrated. These attributes represent a modified list of attributes used by the NTFS file system developed specifically for Microsoft Windows NT. The NTFS file system is described in greater detail in Inside the Windows NT File System, by Helen Custer, published by Microsoft Press and incorporated herein by reference. In FIG. 7, the attributes that make up a file may be divided into two fundamental groups. The first group contains system attributes and the second group contains user attributes. In general, system attributes are used to store information needed or required by the system to perform its various functions. Such system attributes generally allow a robust file system to be implemented. The exact number or type of system attributes is generally dependent wholly upon the particular operating system or particular file system utilized. User attributes, on the other hand, are used to store user controlled data. That is not to say that users may not gain access, under certain circumstances, to one or more system attributes. User attributes, however, define storage locations where a user or client program may store data of interest to the program. In FIG. 7, the system attributes are illustrated generally as 127 and the user attributes are illustrated generally as 128.

System attributes may comprise, for example, standard information attribute 130, attribute list 132, name attribute 134, security descriptor attribute 136, and remote storage attribute 138. Standard information attribute 130 represents the standard "MS-DOS" attributes such as read-only, read/write, hidden, and so forth. Attribute list 132 is an attribute used by NTFS to identify the locations of additional attributes that make up the file should the file take up more than one storage record in the master file table. The master file table is the location where all resident attributes of a file or directory are stored. Name attribute 134 is the name of the file. A file may have multiple name attributes in NTFS, for example, a long name, a short MS-DOS name, and so forth. Security descriptor attribute 136 contains the data structure used by Windows NT to specify who owns the file and who can access it. These attributes are described in greater detail in Inside the Windows NT File System, previously incorporated by reference.

Remote storage attribute 136 identifies a particular file as having remotely stored attributes. The remote storage attribute preferably contains sufficient information to allow the location of remotely stored attributes to be identified. In addition, the remote storage attribute should store information that sets the migration state of the file. This can be in the form of an index into a data table, such as remote data table 92 of FIG. 4 or any other information that allows the migration state to be determined. All attributes, when taken as a whole, should also be able to identify which attributes of a particular file are stored remotely and which attributes are stored locally. Such information may be contained in remote storage attribute 138 or such information may be obtained by examining the other attributes of the file. For example, if each attribute is of a particular length, or if the length of a particular attribute is stored with the attribute, then it may be possible to identify which attributes are stored remotely simply by comparing the expected length with the length actually stored on local storage. If for example, a data attribute is expected to be 100K bytes long and the amount of information actually stored is substantially less, then it may be presumed that the data attribute is stored remotely. Alternatively, such information may simply be incorporated into remote storage attribute 138. In one embodiment, the remote storage attribute comprises:

| Remote Storage Flag | Tag | Data Length | Data |
| --- | --- | --- | --- |

As explained in greater detail below, certain embodiments of the present invention utilize a plurality of driver means for performing I/O processing in order to implement remote data storage processing For example, hierarchical storage manager 102 of FIGS. 5 or 6 may be implemented in one driver means for performing I/O processing and read/write data processing block 116 may be implemented using another driver means for performing I/O processing. These two driver means could then coordinate in order to achieve the objectives of the present invention by passing information back and forth between them. In fact, a driver means for performing I/O processing that implements the remote storage processing functions may simply be one of a plurality of driver means used for various purposes in the I/O system. Such an embodiment is discussed hereafter. In these situations, it may be necessary to identify which driver means should assume responsibility for processing I/O requests involving files with remotely stored attributes. Embodiments within the scope of this invention may comprise means for identifying a particular driver means as the driver that should process at least part of an I/O request. Any mechanism which identifies a particular driver as the owner of the remote storage attribute can be used for such a means. If the remote storage attribute has the structure illustrated in the table above, such a means may comprise, for example, the tag value. In this example, the tag is a data word that contains the identity of the owner of the remote storage attribute. Such a mechanism allows a plurality of hierarchical storage managers to exist within a single system, each adapted to process I/O requests involving different types of files or different types of remote storage devices.

It is preferred that the tags be assigned in a manner so that the same tag is always associated with the same owner driver no matter which system the driver is installed on. In other words, it is preferred that some mechanism exist that assigns a tag value to a particular driver. For example, there may be a central repository or clearing house that assigns blocks of tag values to various driver manufacturers. The driver manufacturers can then assign tags to specific drivers Any other mechanism that allows a tag value to be associated with at most a single driver can also be used. Assigning tag values in this way allows the same owner driver to process the same remote storage requests no matter which system it is installed on. Alternatively, in some situations it may be possible to assign local tag values in a dynamic way so that tag values are assigned by the system during installation. However, such a method is not generally preferred.

In the remote storage attribute illustrated in the table above, an optional remote storage flag is illustrated. The remote storage flag is illustrated above to indicate that a mechanism must exist to allow identification of files that have remotely stored attributes. Such an indication may be given, for example, by using a remote storage flag that indicates a file having remotely stored attributes. Alternatively, other mechanisms may also be used. For example, a flag may be kept for each attribute that can be stored remotely. When an attribute is stored remotely, the flag can be set. Such a mechanism allows not only identification of the fact that remotely stored attributes exist, but also identification of which attributes are stored remotely. In contrast, when an attribute or data is recalled to local storage from remote storage, the flag can be set to a different value. As yet another example, the expected length of each attribute may be compared to the actual amount of data stored locally. As yet another example, one or more of the tag values may be reserved to indicate that a file does not have any remotely stored attributes. Using such a mechanism it would be possible, for example, to reserve tag 0 to indicate that a file did not have any remotely stored attributes. Any other tag value would indicate that the file had at least one remotely stored attribute.

The remote storage attribute illustrated above allows storage of owner controlled data. Embodiments of this invention, therefore, comprise means for storing information used by driver means to manage remotely stored attributes. By way of example, and not limitation, such a means may comprise an owner controlled data field. The owner controlled data field represents a location where the owner of the remote storage attribute may place any type of data needed to properly manage the remotely stored attributes. For example, the location of remotely stored attributes may be stored in the data field of the remote storage attribute. Other examples have also been previously given. As yet another example, some hierarchical storage managers may store the identity of the remotely stored attributes in the owner controlled data field. This would also be a mechanism to allow a hierarchical storage manager to quickly identify which attributes were stored locally, and which attributes were stored remotely. Any other type of data may also be stored in this data field.

In the remote storage attribute illustrated above, the data field is preceded by a data length indicator. In this storage format, the length of the data field is stored in order to ascertain how much data must be read to complete the data field. Alternatively, in some embodiments it may be more efficient to store a data field of a fixed length or a data field that utilizes blocks of information chained together through pointers or links. Essentially, any mechanism that identifies how much data must be read to complete the data field can be utilized. Consideration should also be given to how much data may need to be stored by an owner driver. Such considerations will influence how the data field is stored and the maximum possible length of the data field, Returning now to FIG. 7, consideration is given to group 128, which represents user attributes of a file. As previously explained, user attributes represent those attributes used by a user or other client process to store user or client process information. An NTFS file typically has one or more data attributes illustrated in FIG. 7 by data 1 attribute 140 and data 2 attribute 142. Most traditional file systems only support a single data attribute. A data attribute is basically much like a location where user controlled data can be stored. For example, the document of a word processing document is typically stored in the data attribute of a file. In the NTFS file system, a file can have multiple data attributes. One data attribute is referred to as the "unnamed" attribute while the other attributes are named attributes, each having an associated name. Each of the data attributes represents a storage location where different types of user controlled data may be stored. Using the multiple data attributes of the NTFS file system allows only a portion of the overall data to be stored locally while other data is stored remotely. Thus, if a file contained certain data that was accessed regularly and other data that was accessed only infrequently, the data that was accessed only infrequently could be moved to remote storage while the data that was accessed frequently could be maintained in local storage. In a similar manner, when recalling data to local storage from remote storage it is within the scope of this invention that only a portion of the overall data stored remotely will be recalled.

In addition to one or more data attributes, a file may also have other user defined attributes as illustrated by other attributes 144. Such attributes represent any other attributes that are user defined and that are stored with the file. Such user defined attributes may be created and used for any purpose desired by the user.

Although the above discussion has gone into some detail with regards to a particular type of file, such should be construed as exemplary only and not as limiting the scope of this invention. The present invention will work with any type of file or other entity that has information regarding where remotely stored attributes can be found and the migration state of the file.

Figure 8:
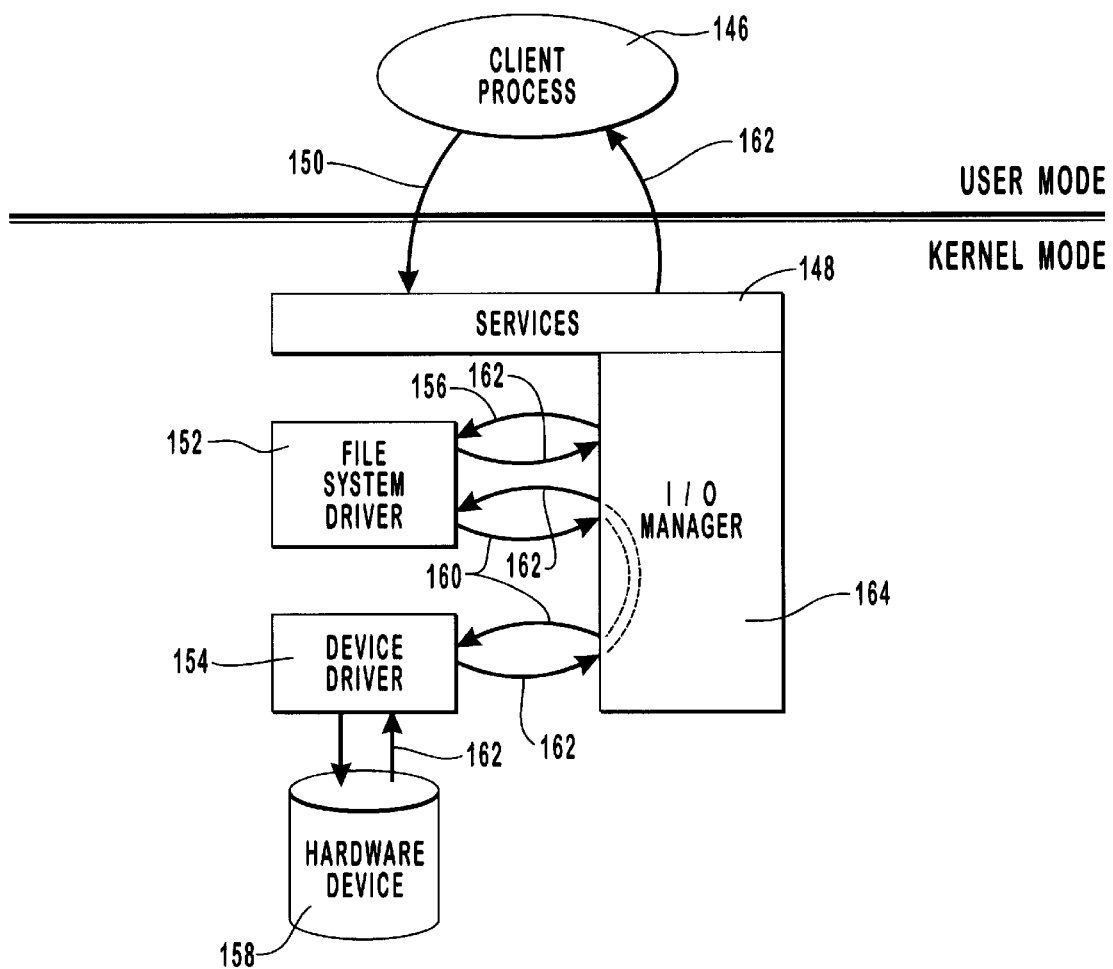
FIG. 8 is a diagram representing an I/O system employing layered drivers.

Certain embodiments of the present invention may be implemented in a system which uses a plurality of driver means for performing I/O processing. In order to more fully understand the context of these embodiments, reference is now made to FIG. 8, which illustrates a simplified diagram of the interaction between a client process and an operating system having an I/O system that uses a plurality of driver means for performing I/O processing. This diagram is representative, for example, of the Microsoft Windows NT operating system. The diagram of FIG. 8 may also represent any operating system which uses a plurality of driver means for performing I/O processing. In FIG. 8, client process 146 makes use of operating system services 148 to perform I/O requests. This is typically achieved by client process 146 making a call to an Application Program Interface (API) function provided by the operating system. Calling the appropriate API function ultimately results in a call to operating system services 148. Such a call is illustrated by arrow 150.

In FIG. 8, client process 146 is illustrated as operating in "user" mode and the operating system services are illustrated as operating in "kernel" mode. Modem operating systems typically provide a robust environment for various application programs and intuitive user interfaces. Such operating systems normally have different operating levels or "modes," depending on the level of sophistication of the operating system and the security features that are implemented by the operating system. Normal application programs typically run at the lowest priority and have a full complement of security devices in place to prohibit interference with other applications, or with other layers of the operating system. Hardware and other services provided by the operating system are only accessed through controlled interfaces or mechanisms which limit the ability of a user application or other process in the user mode to "crash" the system. The lowest priority mode is typically referred to as user mode and is the mode that most computer users are familiar with. Because of the close integration of drivers with their associated hardware and because of the time critical nature of the tasks that many drivers perform, drivers typically run in an operating system mode that has a much higher priority and much lower security protection. This mode is generally referred to as "kernel" mode. Placing the drivers and other operating system services in kernel mode allows the operating system to run at a higher priority and perform many functions that would not be possible from user mode.

When client process 146 calls operating system services 148 in order to perform an I/O request, the I/O request is passed to a first driver means for performing I/O processing. In FIG. 8, file system driver 152 and device driver 154 represent examples of driver means for performing I/O processing. The passing of the I/O request to the first driver means is illustrated in FIG. 8, for example, by arrow 156. File system driver 152 will then take the I/O request and generally perform partial processing of the I/O request before passing the I/O request on to the next driver.

As an example, suppose client process 146 wished to open a particular file on hardware device 158 and retrieve or store information from the file. The I/O request would pass from client process 146 to operating system services 148 and on to file system driver 152. File system driver 152 would then translate the I/O request from a file name to a particular location on hardware device 158. The translation process may also include the number of data blocks that should be read from or written to the hardware device at that particular location. This information can then be passed to the next driver, as for example, device driver 154. The process of passing the information required by device driver 154 is illustrated in FIG. 8 by arrow 160. Device driver 154 takes the location and number of data blocks to be read or written and translates them to the appropriate control signals to retrieve the desired information from or to store the desired information to hardware device 158. The data retrieved may then be passed from device driver 154 to file system driver 152 and ultimately back to client process 146 as indicated by return arrows 162. Status information may be returned in the same manner.

In FIG. 8, I/O requests are not passed directly between file system driver 152 and device driver 154. Rather, the I/O requests are passed between the drivers via I/O manager 164. It is, however, not necessary to have an I/O manager in all implementations. Embodiments may also exist where I/O requests are passed directly from one driver to another without an I/O manager to coordinate transfer.

Although FIG. 8 illustrates a context where an I/O system having a plurality of driver means for performing I/O processing is used to process I/O requests, other I/O systems using more monolithic drivers to communicate to hardware devices may also be used as a context for the present invention. Thus, throughout this description where reference is made to an I/O system having a plurality of drivers, embodiments having monolithic drivers that incorporate the functionality of some or all of the plurality of driver means should be considered in all ways equivalent to the disclosed embodiments.

Figure 9:
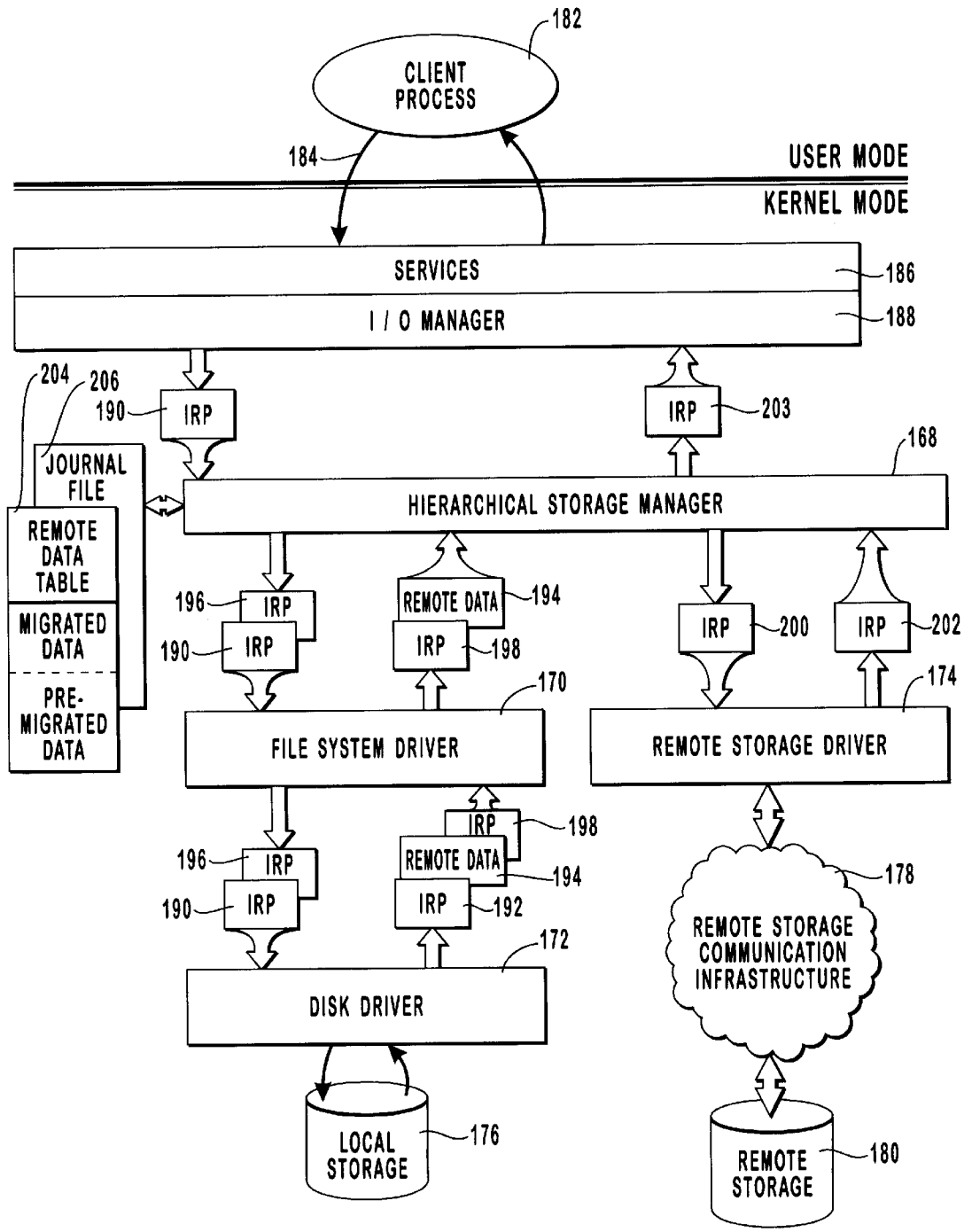
FIG. 9 is a diagram illustrating an embodiment of the present invention.

Turning next to FIG. 9, a more detailed diagram of an embodiment of the present invention is presented. FIG. 9 will be used to discuss various aspects of an exemplary embodiment of the present invention. Throughout presentation of this example, it should be remembered that the example is exemplary only and the principles discussed herein in conjunction with this example can be adapted to a wide variety of embodiments of the present invention. The embodiment illustrated in FIG. 9 is an example of an embodiment designed to operate in an I/O system having layered drivers such as with the Microsoft Windows NT operating system.

The embodiment illustrated in FIG. 9 comprises a plurality of driver means for processing I/O requests. In FIG. 9, such driver means are illustrated by hierarchical storage manager 168, file system driver 170, disk driver 172, and remote storage driver 174. Although hierarchical storage manager 168 is discussed in greater detail below, in summary hierarchical storage manager 168 is responsible for implementing the hierarchical storage management functions. Thus, hierarchical storage manager 168 would implement the functions discussed in conjunction with FIGS. 4, 5, and 6. Similarly, hierarchical storage manager 168 is responsible for implementing most, if not all, the functions that allow the steps illustrated in FIG. 3 to be performed. Many of these functions associated with hierarchical storage manager 168 are discussed in greater detail below.

File system driver 170 and disk driver 172 represent layered drivers, which together access files stored on local storage 176. Remote storage driver 174 provides the functionality necessary for communication over remote storage communication infrastructure 178 to remote storage 180.

It will be appreciated that although depicted as separate components, the hierarchical storage manager 168 and the remote storage driver could alternatively be combined as one component As a further alternative embodiment, the communications between the remote storage driver and the remote storage, via the remote storage infrastructure, could all be performed in kernel mode as depicted or with a portion performed in the user mode as in FIG. 14 described subsequently. When embodied as in FIG. 14, the communications between the hierarchical storage manager and the remote storage driver are performed via a private set of commands vice IRPs facilitated by the file system agent (FSA) in the user mode.

Figure 10:
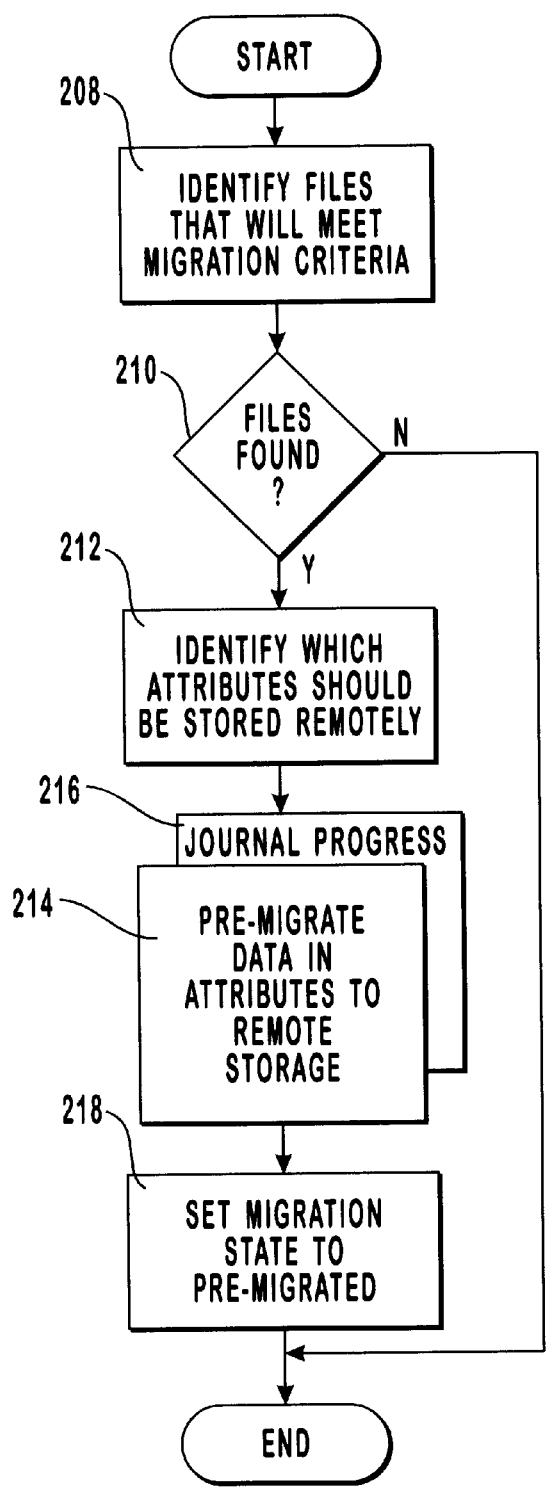
FIG. 10 is a flow diagram illustrating the processing that occurs during pre-migration of data.

As previously explained in conjunction with FIG. 3, embodiments of the present invention are designed to pre-migrate data from local storage, such as local storage 176 to remote storage, such as remote storage 180, prior to the actual time that migration criteria for a particular file is satisfied. As previously explained, such functionality is incorporated into hierarchical storage manager 168. Referring now to FIG. 10, a more detailed flow diagram regarding how hierarchical storage manager 168 accomplishes these functions is presented. In order to pre-migrate data from local storage to remote storage, embodiments within the scope of this invention need to identify candidates for pre-migration. Thus, embodiments within the scope of this invention may comprise means for identifying files that will meet a designated migration criteria at an identified time in the future. By way of example only, in FIG. 10, such means is illustrated by step 208. Any mechanism that allows hierarchical storage manager 168 to identify files that will meet a designated migration criteria at an identified time in the future can be utilized. For example, one mechanism is to constantly be doing incremental searches of local storage 176. In other words, hierarchical storage manager 168 may periodically scan either the entire local storage or a portion of the local storage in order to identify candidates for pre-migration, Although the present invention states that the step identifies files that will meet a designated migration criteria at an identified time in the future, it is not always necessary for hierarchical storage manager 168 to identify the exact time at which a file will meet the migration criteria. Often, it will be sufficient for hierarchical storage manager 168 to identify that a file will meet the migration criteria within a given time frame or beyond an identified time or within an identified time. Thus, the phrase "at an identified time" should be interpreted to include an identification of time to a sufficient accuracy that will allow embodiments of the present invention to achieve its objective and should not be limited to meaning a specific time.

In addition to constantly doing scans of local storage 176, hierarchical storage manager 168 may identify files that will meet the migration criteria in step 208 by tracking changes made to various files on local storage 176. For example, if each change that is made to a file on local storage 176 is logged by one of the driver means, as for example file system driver 170 or hierarchical storage manager 168, then by examining the log the files that have been changed can be identified. By examining the time that the files were changed, and comparing the time that the files were changed to designated thresholds, as for example the time that a file should be considered for pre-migration and/or the time that a file should be considered for migration, relevant candidates for pre-migration can be identified.

The foregoing examination of comparing times of changes made to files is readily effectuated within the NT File System (NTFS). This is because a unique number (Update Sequence Numbers (USN)) identifying whenever a change is made to a file within NTFS are generated and readily tracked. These USNs are the subject matter of another Microsoft Corp. application presently on file and is expressly incorporated herein by reference.

Another mechanism enabling the hierarchical storage manager 168 to identifying file candidates for migration to remote storage from local storage is performed by collecting parameters, such as those previously described, solicited from a system manager/administrator with known I/O means. Other mechanisms may also be used and any appropriate means for identifying files that should be considered for pre-migration can be utilized with the present invention.

Returning now to FIG. 10, decision block 210 tests whether files that should be considered for pre-migration have been found. If no files were found, no data exists for pre-migration and hierarchical storage manager 168 may perform other functions. If, however, hierarchical storage manager 168 identifies files that are pre-migration candidates, then execution proceeds to step 212, which identifies which attributes should be stored remotely. As previously explained, a file may comprise a plurality of attributes. Each of these attributes may be stored either locally or remotely depending on the exact implementation of hierarchical storage manager 168. In general, however, virtually any attribute can be stored either locally or remotely. When appropriate, the hierarchical storage manager may also migrate parts of streams to remote storage. For example, append-only files can have their data migrated partially. Thus, hierarchical storage manager 168 must decide which attributes should be stored remotely for files that have been identified as pre-migration candidates. Various factors may be used to identify which attributes should be stored remotely. For example, size is a good indicator of how much may be gained by storing the attribute remotely. Other considerations may also be taken into account.

If attributes are to be stored remotely, then hierarchical storage manager 168 will pre-migrate the appropriate attributes to the appropriate remote storage medium. Thus, embodiments within the scope of this invention may comprise means for pre-migrating data to a remote storage medium. By way of example, and not limitation, in FIG. 10, such means is illustrated by step 214. Essentially, any mechanism that allows hierarchical storage manager 168 to pre-migrate data from local storage 176 to remote storage 180 can be utilized. All that is necessary is that hierarchical storage manager 168 can read data from local storage 176 and transfer the data to remote storage 180.

When appropriate, the hierarchical storage manager may also migrate parts of streams to remote storage. For example, append-only files can have the data migrated partially.

It will be appreciated that this pre-migration involves a unique state not encountered by prior art hierarchical storage managers. In particular, pre-migration, in addition to the act of migrating candidates that are eligible for migration at a time prior to the time specified for migration, includes the ability to violate the migration policy of the system, as specified by the parameters solicited from the system manager, as previously described.

Preferably, although not strictly required, embodiments within the scope of this invention comprise means for journaling actions taken during the pre-migration process. Journaling is a process whereby a log is kept of actions taken or events that occur during a particular process or within a particular time frame. For example, actions taken by hierarchical storage manager 168 to transfer data from local storage 176 to remote storage 180 are saved as they are completed. In this manner, if the transfer process is interrupted before completion, hierarchical storage manager 168 can identify the actions that have been completed so that the process may be started with the last uncompleted step without the need to repeat any completed steps. In FIG. 10, such means for journaling is illustrated, for example, by step 216. As illustrated in FIG. 10, the journaling of actions taken during the pre-migration process occurs simultaneously with the pre-migration of data itself.

After the data has been pre-migrated to remote storage, the data exists both on local storage and remote storage as previously explained. In order to identify files in this pre-migrated state, embodiments within the scope of this invention may comprise means for tracking a migration state. By way of example, and not limitation, in FIG. 10, such means is illustrated by step 218. Returning for a moment to FIG. 9, when data is pre-migrated from local storage 176 to remote storage 180(the file on local storage 176 is updated by storing certain information in the remote storage attribute of the file. As previously explained, the remote storage attribute of a file is, among other things, utilized to identify which attributes were stored remotely and where such attributes are stored. Such information may be stored within the remote storage attribute or a pointer to such information may be stored. For the migration state, a pointer into a table, such as remote data table 204 of FIG. 9. Remote data table 204 may then identify the state of the file. For example, the file may be stored within a pre-migration section of the table or with an indication that the file is in the pre-migrated state. This is then a signal to hierarchical storage manager 168 that the data resides both locally and remotely. In addition, remote data table 204 may also store information regarding the location on remote storage where the attributes of the file are stored. An example of how hierarchical storage manager 168 may utilize the information stored in remote data table 204 to determine how to process I/O requests is presented below.

Figure 11:
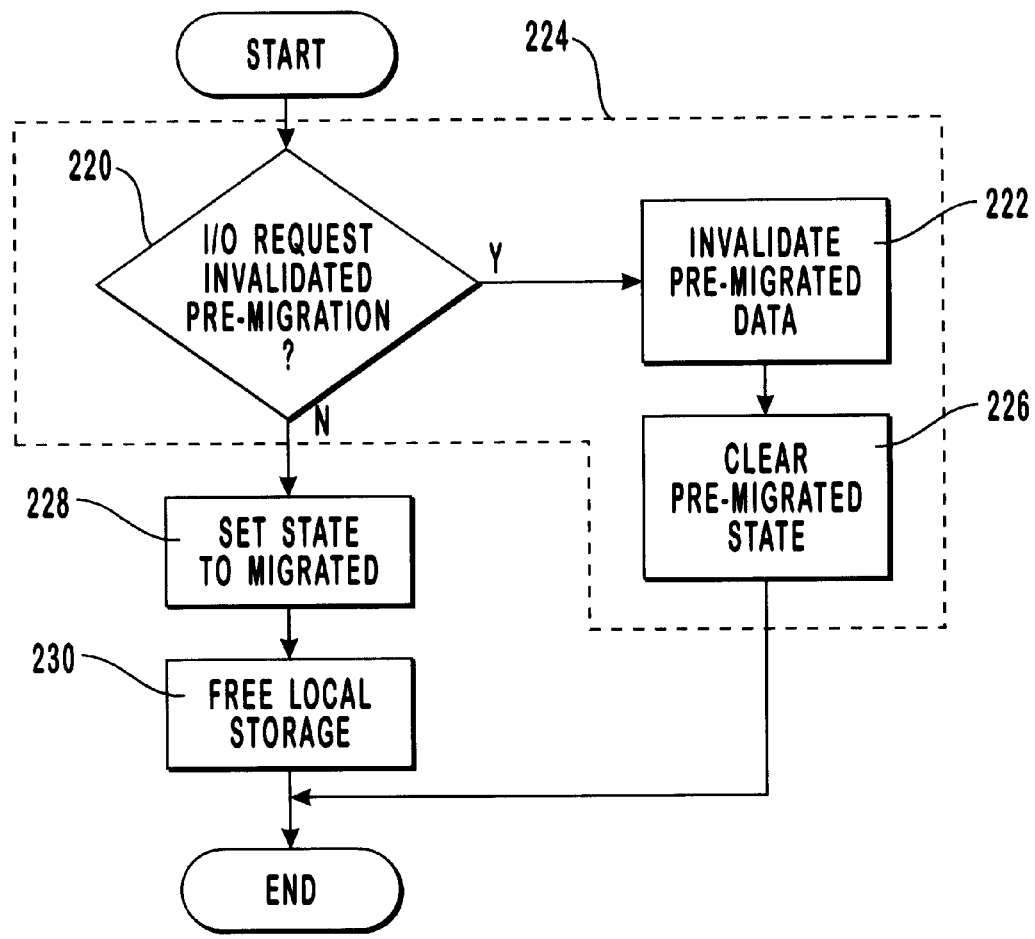
FIG. 11 is a diagram illustrating the processing that occurs when a file is migrated to remote storage.

Referring next to FIG. 11, the processing that occurs when the designated migration criteria is met or when hierarchical storage manager 168 needs to free local storage space on local storage 176 is presented. As previously discussed, if a file has been pre-migrated to remote storage and then an event occurs that invalidates the information that has been pre-migrated to remote storage, then the data that has been pre-migrated to remote storage should be invalidated Thus, embodiments within the scope of the present invention may comprise means for determining whether an I/O request involving a file having pre-migrated data invalidates the pre-migration. In FIG. 11, such means is illustrated, for example, by decision block 220, which determines whether events that have happened since the data of a file was pre-migrated to remote storage has invalidated the pre-migration. Depending on the migration policy, many different types of events may invalidate the pre-migration of a file. For example, if a file is pre-migrated to remote storage and then a change is made to the data of the file, then the data that has been pre-migrated is incorrect. Many different methods can be used to identify files with pre-migrated data that is invalid. As explained in greater detail below in conjunction with FIG. 12, one method is to track accesses to files as they occur and identify any accesses that invalidate the pre-migrated data. If such a scheme is used, then decision block 220, step 222, and step 226, all enclosed in dashed line 224, need not be performed at this stage of the processing, but may be performed when handling I/O requests involving pre-migrated files. This is explained in greater detail in conjunction with FIG. 12 below.

In order to invalidate pre-migrated data, embodiments within the scope of this invention may comprise means for invalidating data that has been pre-migrated. By way of example, and not limitation, in FIG. 11, such means is illustrated by step 222, which invalidates pre-migrated data if appropriate. Many mechanisms may exist to invalidate pre-migrated data. The mechanism utilized will depend, in large measure, on the type of remote storage. For example, data may be easily erased from certain types of remote storage without adversely affecting the surrounding data. An example of such would be a magnetic disk drive. On the other hand, other types of remote storage are not amenable to easy deletion of data. Write once optical disks or magnetic tape may be an example of such types of storage devices. If the data on remote storage is not easily erased, then It may be better to mark the data as invalid through some mechanism so that the data is never utilized. For the purposes of this invention, all that is important is that the hierarchical storage manager be able to identify or ignore invalid data without affecting its operation. Note that part of invalidating remotely stored pre-migrated data may be changing information stored locally that refers to the remotely stored pre-migrated data. These are implementation details that will depend upon particular design choices.

After data on remote storage has been marked invalidated, it may be desirable to clear the pre-migrated state of the file. As previously explained, a hierarchical storage manager in accordance with the present invention, such as hierarchical storage manager 168 of FIG. 9, may track a migration state of the files. Such a migration state can identify whether a file has data that has been pre-migrated, migrated, or resides completely on local storage (neither pre-migrated nor migrated). Such information may be saved, for example, by hierarchical storage manager 168 in remote data table 204. Remote data table 204 may be stored on local storage 176 in order to make the data table persistent. Embodiments within the scope of the present invention may therefore comprise means for tracking a migration state for data. In FIG. 11, such means may comprise, for example, clear pre-migration state step 226. This step indicates that it may be desirable to clear the pre-migration state of any file that has had pre-migrated data. In essence, step 226 simply represents a process of placing a file whose pre-migrated data has been invalidated into the same state that it would have been had the pre-migration of data not occurred. Referring to FIG. 9, if hierarchical storage manager 168 stores information regarding pre-migrated data and migrated data in remote data table 204, then the step of clearing the pre-migrated state may be accomplished by removing the entry from remote data table 204. In addition, any information in the remote storage attribute of the file which refers to pre-migrated data should also be eliminated so that the remote storage attribute of the file is in the same state as it would have been had the pre-migration not occurred.

In some embodiments, it may be desirable to only partially invalidate the pre-migrated data. Such a situation may occur, for example, if the migration policy allows for migration of selected attributes of a file. In such an embodiment, the attributes may be treated independently and migrated independently. In an embodiment that treats attributes of files independently, if one attributes is changed so as to invalidate the pre-migration, yet another attribute remains unchanged then it may be desirable to only invalidate the portion of the data that was changed. Note that the various options that will be available are dependent upon the implementation of the hierarchical storage manager and the migration policy. In some migration policies any access to a file, whether data was changed or not, may invalidate the pre-migration. For example, if a migration policy heavily weights the time since last access in deciding which files to migrate to remote storage, then it may be desirable to invalidate any pre-migration once a file is accessed, because the time since last access criteria of the migration policy would no longer be met. On the other hand, since a file with pre-migrated data resides both locally and remotely, it may be desirable to maintain the pre-migrated state whenever possible and simply reset the point at which the file becomes eligible for migration.

Returning now to FIG. 11, if an event has not occurred that invalidates the pre-migration of the data, then the system is ready to fully migrate the data from local storage to remote storage. As discussed in conjunction with FIG. 3, this involves setting the migration state to migrated and freeing local storage. This is illustrated in FIG. 11 by steps 228 and 230. As previously discussed, embodiments within the scope of this invention may comprise means for tracking a migration state for data. By way of example, such means may comprise step 228. The process of setting the state to migrated may be nothing more than changing an entry in a remote data table, such as remote data table 204 of FIG. 9. Alternatively, setting the state to migrated may also involve changing information stored in the remote storage attribute of the file. All that is necessary for the present invention is that some mechanism exists to allow the hierarchical storage manager, such as hierarchical storage manager 168 of FIG. 9, to identify that the data in the file has been migrated from local storage to remote storage. Thus, any mechanism that allows the hierarchical storage manager to identify which attributes have been migrated to remote storage and where such attributes are stored, can be part of step 228.

After the migration has been recorded, the next step is to free local storage. Thus, embodiments within the scope of this invention may comprise means for freeing local storage. By way of example, and not limitation, such means is illustrated in FIG. 11 by step 230. The process of freeing local storage will depend upon the exact implementation of the I/O system. For example, in the embodiment illustrated in FIG. 9, hierarchical storage manager 168 may generate a request that is processed by file system driver 170 and disk driver 172 that removes specified attributes from the designated files. In other embodiments where the hierarchical storage manager is implemented as a part of a monolithic I/O system, other mechanisms may need to be utilized. The particular implementation will dictate the procedure utilized to free local storage by deleting the information that has been migrated from local storage to remote storage.

One embodiment for freeing the local storage at step 230 includes the use of sparse file technology, With sparse file technology when the time to free the local storage arrives, the data of the file is simply indicated as a "zero" to the local storage system. In this manner, the local storage understands the data of the file to be gone so that the storage space is readily available for other purposes such as capturing incoming new data. With this technology, substantial speed advantage is gained over normal file systems. Sparse file technology is the subject of other patents and is not discussed herein further in detail.

Alternatively still, the step 22 of invalidating the pre-migrated data, the step 228 of setting a state to migrated and the step 230 of freeing local can readily be combined within the context of NTFS. For example, since a new Update Sequence Number (USN) is generated every time a change occurs to a file a comparison can be made between the USN of the file when the file is pre-migrated and when the file is truncated or freed from local storage. If a change exists between the USN's it is readily understood that a change to the file has occurred and invalidation of the pre-migrated data can readily be performed. If the USN's are the same, then no change to the file occurred and invalidation need not be performed. The USN's may be stored either locally or remotely but it is preferred that they by readily present on local storage. The hierarchical storage manager preferably implements these storage decisions.

As one final comment, it should be recognized that although FIG. 11 is designed to represent the sequence of processing that may occur by hierarchical storage manager 168 of FIG. 9 when the migration time of a particular file is reached, as previously discussed, it may not be necessary to immediately migrate data from local storage to remote storage when the migration time comes. Embodiments may employ an aggressive pre-migration policy along with a lazy migration policy that delays migration of data as long as possible until a need arises to free local storage. This will allow the maximum amount of data to be stored locally while, simultaneously, providing a mechanism to rapidly migrate data from local storage to remote storage should the need arise to reclaim local storage.

Figure 12:
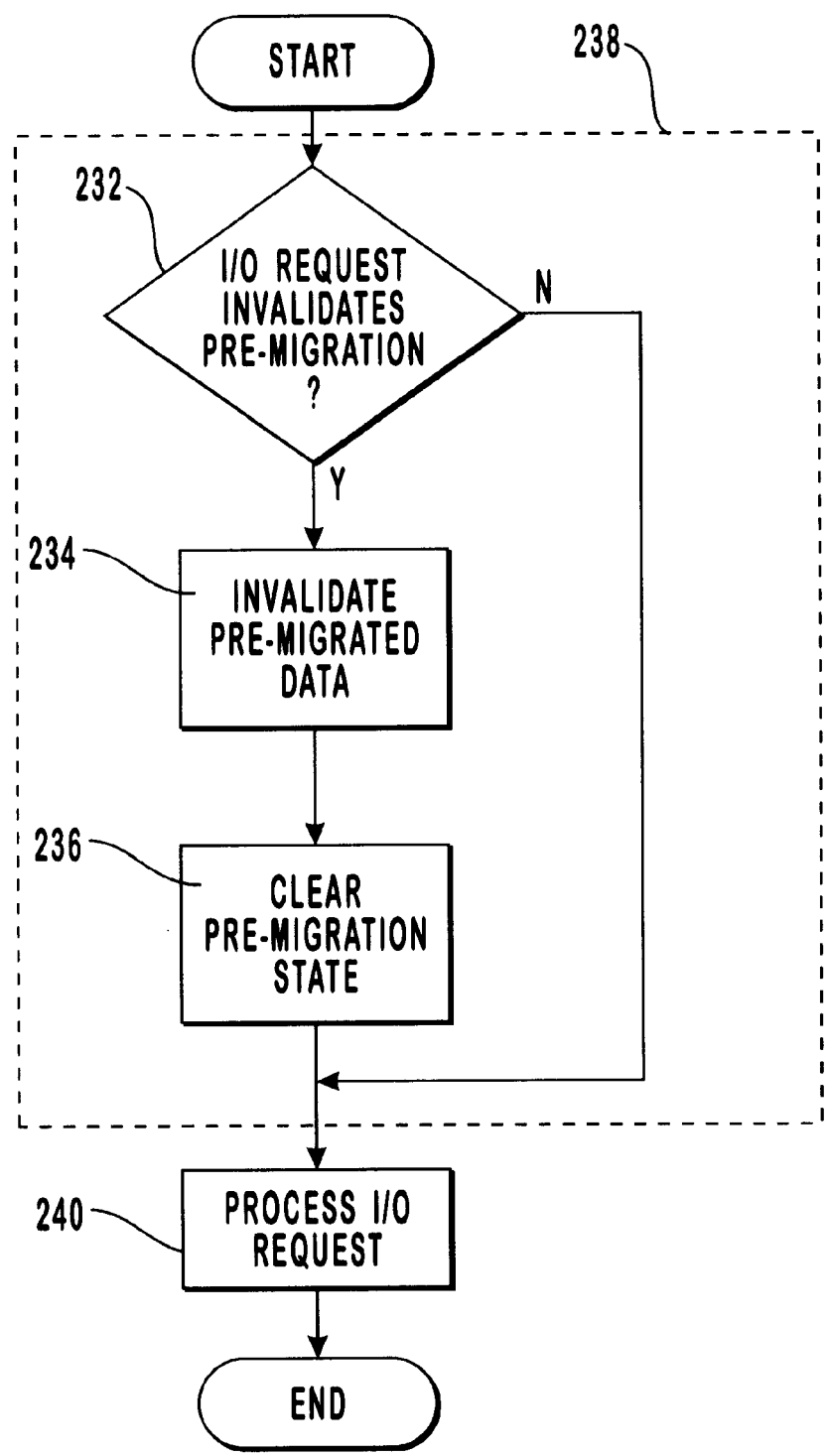
FIG. 12 is a diagram illustrating processing of an I/O request for files having pre-migrated data.

As discussed more fully herein, hierarchical storage manager 168 of FIG. 9 is involved in processing I/O requests involving files that have pre-migrated or migrated data. The structure of the embodiment of FIG. 9, as explained more fully hereafter, allows hierarchical storage manager 168 to intervene in the processing of any I/O requests involving files with pre-migrated or migrated data. Thus, hierarchical storage manager 168 may examine the I/O requests as they arrive to determine whether the I/O request would invalidate pre-migrated data. There is, therefore, no need to wait until the migration time arrives to check whether an I/O request has invalidated the pre-migration of the data. The steps surrounded by dashed line 224 of FIG. 11 may be performed when I/O requests are processed. This is illustrated in FIG. 12. In FIG. 12, decision block 232, step 234, and step 236 correspond to decision block 220, step 222, and step 226 of FIG. 11, respectively. Thus, in FIG. 12 the steps enclosed by dash line 238 may be performed either as illustrated in FIG. 12 or as illustrated in FIG. 11. The steps surrounded by dash line 238 perform the same functions as the steps surrounded by dash line 224. Step 232 may, therefore, also be an example of means for determining whether an I/O request involving a file having pre-migrated data invalidates the pre-migration, step 234 may be an example of means for invalidating data that has been pre-migrated, and step 236 may be an example of means for tracking a migration state for data.

As illustrated in FIG. 12, after the I/O request is checked to determine whether it invalidates the pre-migration of a file, the I/O request is processed as illustrated in step 240.

Returning now to FIG. 9, an example will be presented which illustrates how the embodiment of FIG. 9 allows hierarchical storage manager 168 to intervene in the processing of I/O requests involving files with pre-migrated or migrated attributes. Throughout this example, the file structure of files stored on local storage 176 is assumed to be similar to FIG. 7, in that the file has a remote storage attribute as described above. In FIG. 9, client process 182 makes an I/O request to system services 186 as illustrated by arrow 184. I/O manager 188 receives the I/O request and coordinates the transfer of the I/0 request among the various driver means of the I/O system.

As previously described, hierarchical storage manager 168 is responsible for managing remotely stored attributes of files or other entities. This includes, among other things, the processing illustrated in FIGS. 10 through 12 and the functions described in conjunction with FIGS. 4, 5, and 6. Thus, hierarchical storage manager 168 is responsible for pre-migrating data from local storage 176 to remote storage 180 prior to the time that the migration criteria is met. Hierarchical storage manager 168 is also responsible for migrating data from local storage 176 to remote storage 180 at the appropriate time. Finally, hierarchical storage manager 168 is responsible for coordinating and handling I/0 requests involving files or other entities with pre-migrated or migrated data, as described more fully hereafter. File system driver 170 is responsible for translating a request for access to a file or directory to a physical location on local storage 176. Disk driver 172 is responsible for retrieving information from or placing information on local storage 176. Remote storage driver 174 is responsible for coordinating and managing transfer of information to and from remote storage 180 through remote storage communications infrastructure 178. The embodiment of FIG. 9 thus uses a plurality of driver means, each responsible for a specific function or group of functions, to provide a robust I/O environment.

When client process 182 makes an I/O request as indicated by arrow 184, I/O manager 188 creates an I/O Request Packet (IRP) and coordinates the transfer of the IRPs among the various drivers in the I/O system. In this example, IRP 190 is created by I/O manager 188 and passed through each succeeding driver, with each driver performing any necessary pre-processing in order to enable the functions of the lower level driver, until it reaches disk driver 172. Disk driver 172 then retrieves the desired information from local storage 176 and returns such information via IRP 192. Note that IRP 192 can be the same as IRP 190. They are numbered differently to emphasize the data flow of the example. If the information requested comes from a file with neither pre-migrated or migrated data, the I/O request may be completed without the intervention of hierarchical storage manager 168. Thus, in such a situation, the IRP would be passed back through the various drivers until the appropriate response was received by client process 182.

If, however, the I/O request involves a file or other entity with pre-migrated or migrated data, then hierarchical storage manager 168 must intervene and determine what should be done to complete the I/O request. File system driver 170 must, therefore, be able to identify I/O requests involving files having pre-migrated or migrated data. Thus, embodiments within the scope of this invention may comprise means for identifying files stored of the local storage medium that have data stored on the remote storage medium. Such files can be identified by examining the remote storage attribute. By way of example, such means may comprise a mechanism that examines the remote storage attribute of a file. As explained in greater detail below, information in the remote storage attribute may be returned to file system driver 170 by disk driver 172.

Embodiments within the scope of this invention may comprise means for passing responsibility for processing I/O requests involving files that have data stored on the remote storage medium to the hierarchical storage manager. By way of example, and not limitation, such means may comprise a mechanism that allows one driver to turn control over to another driver. Such mechanisms may include direct function calls or, in an embodiment such as that illustrated in FIG. 9, the creation or modification of an IRP that is then passed to another driver and allows the other driver to assume control for processing the I/O request.

As previously discussed, the remote storage attribute can contain an I.D. which identifies a particular driver as the owner of the remote storage attribute. File system driver 170 can detect that the remote storage attribute contains valid information and can thus pass control for processing the I/O request to the next higher layer driver. The next higher layer driver can examine the identity of the remote storage attribute and, if it matches, can assume responsibility for processing the I/O request. This process is illustrated in FIG. 9.

When disk driver 172 retrieves information, it can retrieve the data stored in the remote storage attribute. This is illustrated in FIG. 9 by remote data 194. Remote data 194 may then be passed to file system driver 170, which can examine remote data 194 to determine whether the file needs to be processed by a different driver. File system driver 170 can then pass remote data 194 to the next higher layer driver, in this case hierarchical storage manager 168. Hierarchical storage manager 168 can then examine remote data 194 and determine whether the I.D. matches an I.D. that it should process. Hierarchical storage manager 168 may then assume responsibility for processing the I/O request. Thus, by storing an I.D. corresponding to the hierarchical storage manager in the remote storage attribute of a file, I/O request involving that file will be processed by hierarchical storage manager 168.

Once hierarchical storage manager 168 assumes responsibility for processing the I/O request, hierarchical storage manager 168 may take whatever action is necessary to process the I/O request. For example, if the I/O request involves a file having pre-migrated data, the steps surrounded by dash line 238 of FIG. 12 may be performed to determine whether the I/O request will invalidate the pre-migrated data. In addition, for I/O requests involving files having migrated data, the functions previously described in conjunction with FIG. 6 may be performed. That is, hierarchical storage manager 168 may examine the I/O request and determine whether the I/O request can be filled by retrieving information from local storage 176. If so, hierarchical storage manager 168 can create a new IRP, such as IRP 196 and pass it to file system driver 170 and disk driver 172 in order to retrieve the appropriate information. In the alternative, if information must be retrieved from remote storage 180 then hierarchical storage manager 168 may generate an IRP, such as IRP 200, and pass it to remote storage driver 174 which can then retrieve the appropriate information from remote storage 180 via remote storage communication infrastructure 178. As actions are taken to fill the I/O request, hierarchical storage manager 168 may update remote data table 204 as appropriate to track the state of the file that is the subject of the I/O request. Many of the various events that may occur have been previously described.

Once hierarchical storage manager 168 has retrieved the appropriate information through whatever mechanism is required, hierarchical storage manager 168 may return the requested information via IRP 203 which can then be passed back to client process 182.

Figure 13:
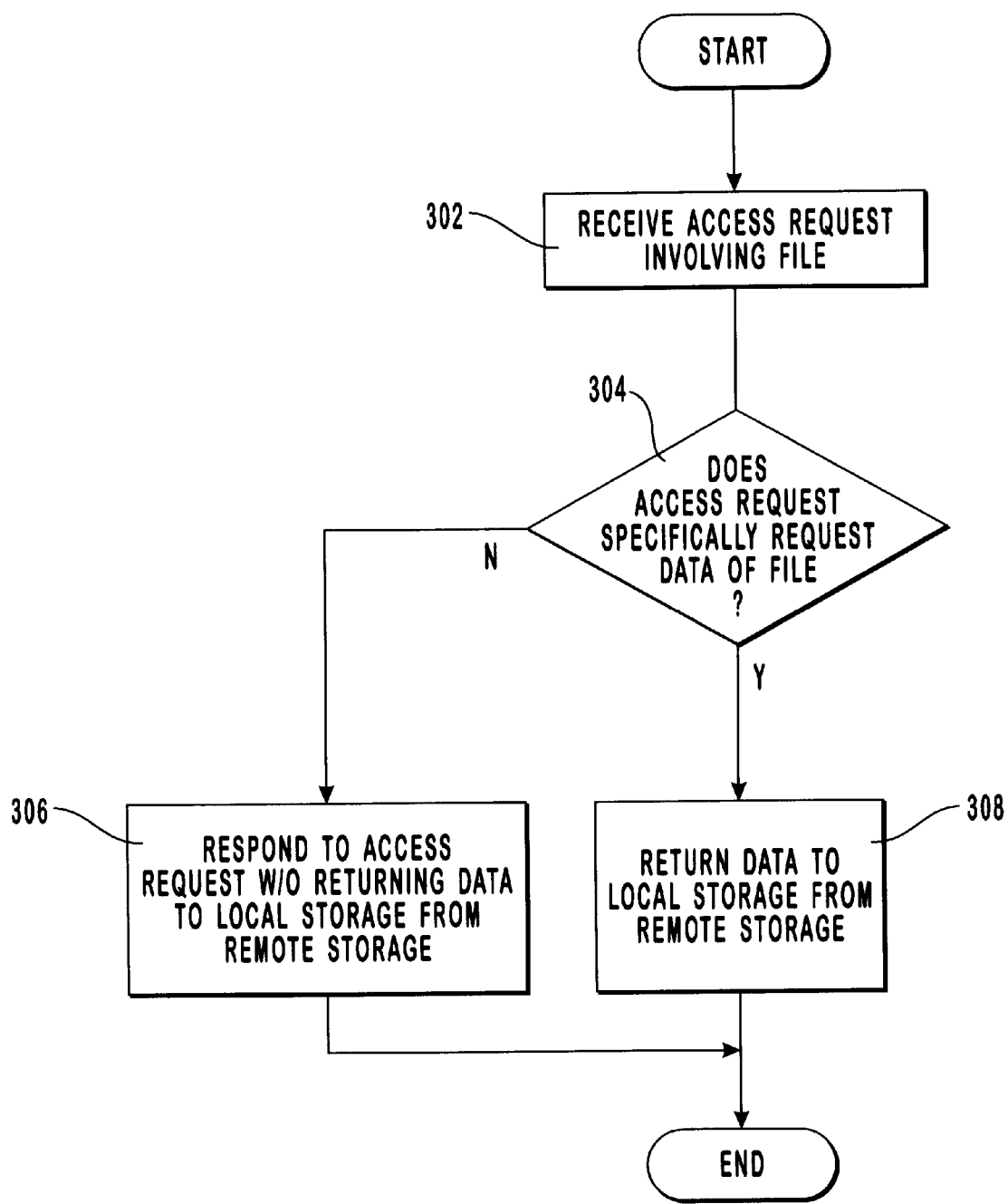
FIG. 13 is a flow diagram of one embodiment for recalling data to local storage from remote storage.

More information useful as general information related to various aspects of this invention can be obtained from two co-pending U.S. applications. Co-pending U.S. patent application Ser. No. 09/939,593, entitled "FILE SYSTEM PRIMITIVE ALLOWING REPROCESSING OF I/O REQUESTS BY MULTIPLE DRIVERS IN A LAYERED DRIVER I/O SYSTEM," now abandoned discloses a generalized mechanism for employing a special attributed, such as a remote storage attribute, to allow multiple drivers to intervene in the processing of and I/O request. U.S. Pat. No. 5,931,935, entitled "FILE SYSTEM PRIMITIVE ALLOWING REPROCESSING OF I/O REQUESTS BY MULTIPLE DRIVERS IN A LAYERED DRIVER I/O SYSTEM," discloses more information regarding I/O systems having layered drivers that incorporate remote storage as an integral part of the I/O system. The foregoing patent application and patent incorporated herein by reference As indicated previously, regardless of the architecture used to implement the present invention, for various reasons it is often necessary at a later time to recall the data to the local storage from the remote storage. With reference to FIGS. 13 and 14, two preferred embodiments of recalling data are implemented. As a precursor to the steps, however, it will be appreciated that similar to implementing the migration policy, parameters may first be collected from a system manager in order to specify the recall policy.

Thereafter, at step 302 an access request, preferably an IRP, is received that involves or somehow implicates data of a file that is remotely stored. At step 304 the access request is evaluated to determine whether a specific request is being made to access the actual data of the file or whether the request is merely inquiring about properties of the file or data. For example, the access request might seek to ascertain the size of the file or when the file was last opened, etc. In either event, the actual data of the file is not being requested and at step 306 response (such as response 122 in FIG. 6) to the access request can be provided without returning the data to the local storage from the remote storage. In this manner, advantage is gained over conventional systems because the request is unconcerned with retrieval of the data from the remote storage and by not recalling the data, valuable time is saved in responding to the access request. Advantage is also gained because the local storage space remains free and unencumbered of data returned from the remote storage and is available for other purposes.

On the other hand, if at step 304 it is determined that the access request is specifically requesting data from the remote storage, then at step 308 data is returned to the local storage from the remote storage. It will be appreciated that during the determination of whether the access request is specifically requesting the data of the file, that the return of data to the local storage is delayed which is perhaps in violation of the recall policies.

Various mechanisms exist that can effectively ascertain whether the access request is specifically requesting access to the data of the file stored in remote storage. A preferred mechanism includes prompting a user as to the nature of the access request whereby the user can respond to a selection of alternatives or can enter a written description.

As an alternative to recalling the data to the local storage from the remote storage at step 308, it will be appreciated that, in the event that the data can be apportioned, perhaps only a portion of the data of the file may be recalled to the local storage. Such is the situation with a file having the structure as indicated in FIG. 7.

Figure 14:
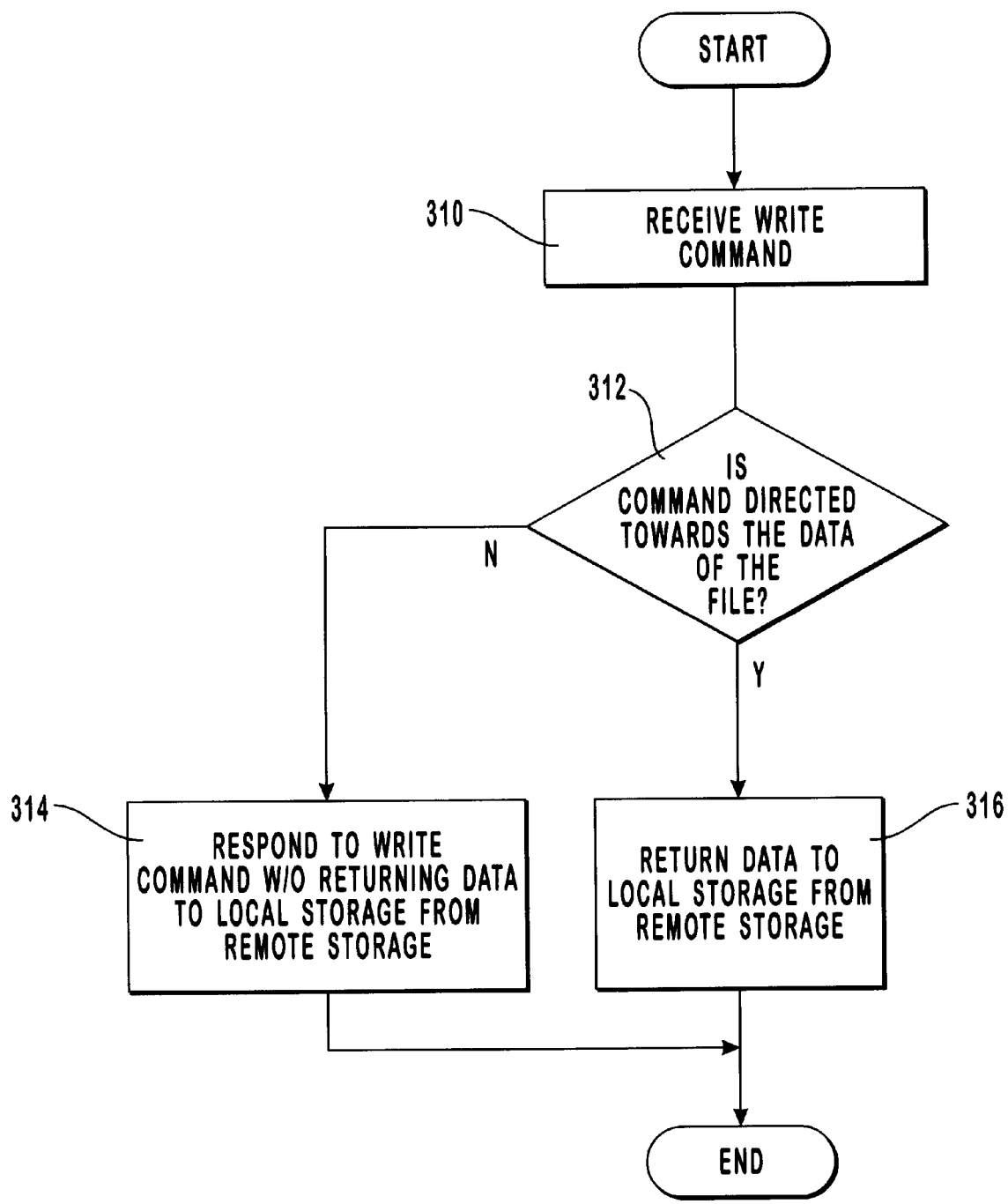
FIG. 14 is a flow diagram of another embodiment for recalling data to local storage from remote storage.

With reference to FIG. 14, another embodiment of recalling data to the local storage is depicted. Again, a preliminary step perhaps includes the collection of parameters from the system manager to ascertain the recall policy for recalling data to the local storage. Thereafter, at step 310 a write command or operation is received that implicates the data of the file that is remotely stored. At step 312 this write command is evaluated to ascertain whether the write command is directed at the data of the file or to some other file property, descriptor, attribute, etc.

In the event the write command is directed towards something other than the data, at step 314 a response to the write command is implemented without returning or recalling the data to the local storage from the remote storage. Conversely, if the write command at step 310 is directed to the data or a portion thereof, at step 316 the data is recalled to the local storage from the remote storage. In this manner, the data of the file may be written to and the data changed or updated.

By evaluating the write command at step 312 before returning data to the local storage from the remote storage, several advances over the prior art are achieved. For example, in contrast to prior art systems that more eagerly return or recall data, the local storage space remains unencumbered in processing time and/or storage space because data of a file is not recalled until absolutely necessary No presumption exists in the return of data.

Figure 15:
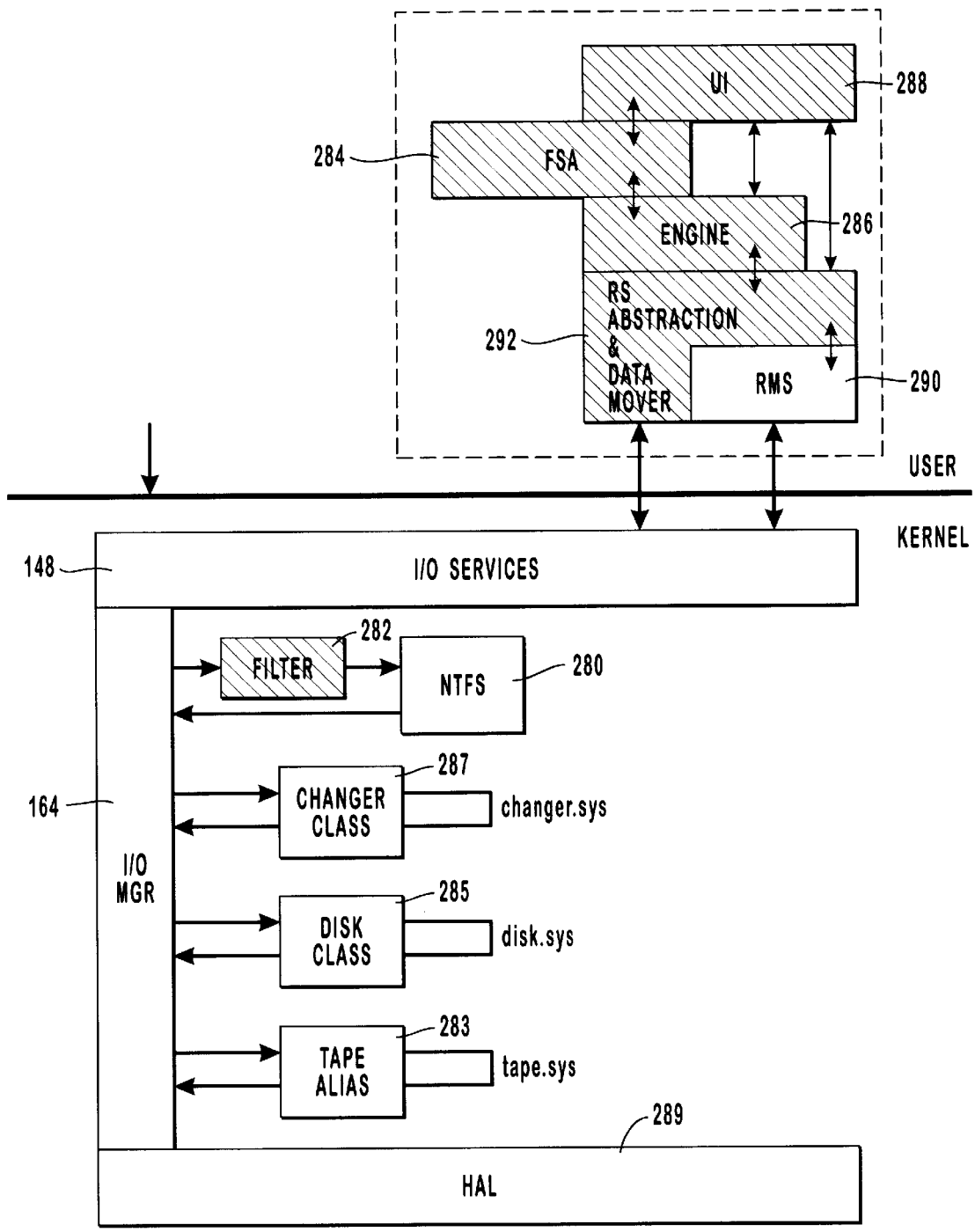
FIG. 15 is a diagram representing another preferred architecture for implementing the present invention.

FIG. 15 is a diagram representing another preferred architecture for implementing the present invention. The hierarchical storage manager as previously described is further described by a division thereof into individual components, indicated as crosshatched boxes, separated across the user and kernel mode barrier and in conjunction with a known NT File System (NTFS) 280. As before, an I/O service 148 and an I/O manager 164 are provided that operate in kernel mode.

The embodiment depicted in this figure will be used to illustrate an exemplary recall of data. A filter 282 is provided between the NTFS 280 and the I/O Manager 164 to intercept all IRP's, such as an open call, coming from the I/O manager 164. In this manner, the filter can provide an advance indication to the NTFS to alert the file system to various items such as notification that a reparse point has been found, for example.

In the event that an IRP requests a reading of data, after the filter 282 conveys this to the NTFS 280, the NTFS communicates back to the I/O manager 164 and requests the data from the File System Agent, FSA, 284. In general, the FSA 284 is where the processing and tracking of the pre-migration lists occurs. Thus, the FSA 284, preferably via an internal data table and/or a journal file as previously described, tracks files that have been pre-migrated and/or truncated from the local storage.

Then, the FSA 284, by using information that the filter passes about the location of the data of the file, communicates with the engine 286 to retrieve the data. Upon retrieval of the data, the engine places the data in a buffer to respond to the request of the reading of the data.

As another example, if the filter receives a write command, the filter communicates with the FSA 284 to retrieve all the data and place the data in the NTFS 280. Thereafter, information is passed to indicate that the data is no longer in a migrated state. It will be appreciated that one skilled in the art will readily understand the communications paths taken between blocks, such as the filter 282 and the FSA 284, by the direction and placement of the arrows in the figure between the various blocks. These paths are not described herein in detail.

As is understood in the art, the UI 288 is the user/interface and supplies most of its commands to the FSA 284. The engine 286 is the actual administrator of the remote storage media which is preferably tapes in a tape library but may additionally be a disk changer, such as a CD jukebox, or a disk device. These media are interfaced to the I/O manager 164 via a tape alias 283, a changer class 287 and a disk class 285, respectively. A Hardware Abstraction Layer (HAL) is also depicted and represents a software entity that makes each of the hardware devices appear fairly standard to the system regardless of their make and/or model.

The RMS 290 is an NT Removable Media Service useful for providing administration of the library of removable storage. The RS abstraction and data mover 292 provide the system with an abstraction of the model and preferably provides indication of which data should be pre-migrated. Some of these blocks are the subject of various other patents and/or publications and their description is beyond the scope of the invention. Thus, they are not described herein in additional detail.

In summary, the present invention involves a system that uses policies to migrate and recall data from between local and remote storage. A system manager identifies parameters for each of the migration and recall policies while the system is provided latitude in violating or obeying the policies.

The hierarchical storage manager identifies candidates for pre-migration prior to the time that the files will actually meet designated migration criteria. Data in the files are then migrated from local storage to remote storage. The pre-migrated state is then recorded and the file is maintained locally until the migration time arrives. At some point after the migration time arrives, data that has been pre-migrated from local storage to remote storage is then deleted from local storage so that the data exists only on remote storage. The migration state is changed from pre-migrated to migrated, and the migration of the data from local storage to remote storage is complete.

The present invention may be implemented in any type of hierarchical storage manager. A preferred embodiment disclosed herein relies on a plurality of drivers in a layered relationship with each driver performing a function or group of functions. Such an embodiment, however, is not necessary for the present invention and any type of hierarchical storage manager may be adapted to incorporate the principles of the present invention. The present invention provides many advantages over prior art hierarchical storage managers. One advantage is that the present invention allows local storage to be freed very rapidly when the migration time arrives. Furthermore, the present invention allows migration to be delayed, in some embodiments, until local storage is needed. Recall of the data to local storage from remote storage is delayed until such time as it is ascertained that it is absolutely necessary to return the data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a system having access to both a local and a remote storage medium, wherein migration policies are used to migrate data from the local storage medium to the remote storage medium, a method of pre-migrating the data prior to fully migrating the data in a manner such that the data can be rapidly deleted from the local storage medium and migrated when migration policies associated with the data are satisfied, said method comprising the steps of:

obtaining parameters that specify migration policies under which data is to be migrated from the local storage medium to the remote storage medium such that, when the data is migrated, the data exists at the remote storage medium and does not exist at the local storage medium;

identifying a first file stored on the local storage medium that has not yet satisfied the migration policies and is not yet eligible for migration from the local storage medium to the remote storage medium according to the migration policies;

even though the migration policies have not yet been satisfied, pre-migrating data in said first file to the remote storage medium so that the pre-migrated data exists on the local storage medium and also exists on the remote storage medium prior to said first file satisfying the migration policies;

prior to said first file satisfying the migration policies, receiving a request to write incoming data to the local storage medium, the local storage medium not having sufficient free space to store the incoming data without deleting data already stored at the local storage medium;

determining whether a second file that (1) contains other pre-migrated data, and (2) has satisfied the migration policies, exists on the local storage medium;

if said second file exists, migrating said second file from the local storage medium to the remote storage medium so as to create said sufficient free space; and if said second file does not exist, migrating said first file from the local storage medium to the remote storage medium to create said sufficient free space notwithstanding said first file not yet satisfying the migration policies.

2. A method as recited in claim 1, wherein said second file exists, such that said second file is migrated to create said sufficient free space, the method further comprising the step of deleting the first file from the local storage medium when said first file satisfies the migration policies.

3. A method as recited in claim 1, further comprising the step of journaling actions taken to pre-migrate data to said remote storage medium so that should interruption of the pre-migration process occur, the pre-migration process may be resumed without repeating actions already completed.

4. A method as recited in claim 1, further comprising the step of tracking which data has been pre-migrated to said remote storage medium.

5. A method as recited in claim 4, wherein said step of tracking which data has been pre-migrated to said remote storage is performed by keeping a list of the files having data that has been pre-migrated to said remote storage.

6. A method as recited in claim 5, wherein said list is kept as an integral part of an I/O system in a manner that provides faster access than a normal file.

7. A method as recited in claim 1, wherein when said migration policies are satisfied and pre-migrated data has been deleted from the local storage medium, the method further comprises the step of identifying pre-migrated data that has been deleted from the local storage medium as data migrated to remote storage.

8. In a system having access to both a local and a remote storage medium: wherein migration policies are used to migrate data from the local storage medium to the remote storage medium, a method of pre-migrating the data prior to fully migrating the data in a manner such that the data can be rapidly deleted from the local storage medium and migrated when migration policies associated with the data are satisfied, said method comprising the steps of:

obtaining parameters that specify migration policies under which data is to be migrated from the local storage medium to the remote storage medium such that, when the data is migrated, the data exists at the remote storage medium and does not exist at the local storage medium, said policies comprising (1) a minimum amount of elapsed time with no access for a file to be a candidate for migration, and (2) a desired level of occupancy of the local storage medium, identifying at least one file stored on the local storage medium that has not yet satisfied the migration policies and is not eligible for migration from the local storage medium to the remote storage medium according to the migration policies;

even though the migration policies have not yet been satisfied, pre-migrating data in said at least one file to the remote storage medium so that the pre-migrated data exists on the local storage medium and also exists on the remote storage medium prior to said at least one file satisfying the migration policies; and when said at least one file satisfies the migration policies, then deleting said pre-migrated data from the local storage medium so that the pre-migrated data exists only on the remote storage medium.

9. A method as recited in claim 8, further comprising the step of determining that there has been no data written to said at least one file since said data was pre-migrated to said remote storage medium, the step of deleting said pre-migrated data being conducted in response to said at least one file satisfying said migration policies and also in response to the step of determining that there has been no data written to said at least one file.

10. A method as recited in claim 8, further comprising the step of determining that there has been no access to said at least one file since said data was pre-migrated to said remote storage medium, the step of deleting said pre-migrated data being conducted in response to said at least one file satisfying said migration policies and also in response to the step of determining that there has been no access to said at least one file.

11. A method as recited in claim 8, wherein, after said at least one file satisfies said migration policies and said pre-migrated data has been deleted from the local storage medium, the method further comprises the steps of:

receiving a file access request that involves said at least one file; and if said file access request does not specifically request access to the data in said at least one file that exists only on the remote storage medium, then delaying recall of said data in said at least one file until an access request is received that specifically requests access to said data in said at least one file that exists only on the remote storage medium.

12. A method as recited in claim 8, further comprising the step of journaling actions taken to pre-migrate data to said remote storage medium so that should interruption of the pre-migration process occur, the pre-migration process may be resumed without repeating actions already completed.

13. A method as recited in claim 12, further comprising the step of identifying data that has been pre-migrated to said remote storage medium as having a pre-migrated state.

14. A method as recited in claim 13, wherein after said at least one file satisfies said migration policies and said pre-migrated data has been deleted from the local storage medium, the method further comprises the step of identifying pre-migrated data that has been deleted from the local storage medium as having a migrated state.

15. A method as recited in claim 14, further comprising the step of adding information to a remote storage attribute of said at least one file when data from said at least one file has either said pre-migrated state or said migrated state.

16. A method as recited in claim 15, further comprising the step of keeping information regarding data with a pre-migrated state in a file stored on non-volatile memory so that if a power failure should occurs said information can be recovered from said file stored on said non-volatile memory.

17. A method as recited in claim 16, further comprising the step of keeping information regarding data with a migrated state in said file stored on said non-volatile memory.

18. A method as recited in claim 17, wherein said remote storage attribute points to at least one entry in said file stored on said non-volatile memory.

19. A method for selectively returning data of a file from a remote storage medium to a local storage medium in response to an access request for the data made after the data has been migrated from the local storage medium to the remote storage medium, the method comprising the steps of:

storing the data of the file on the remote storage medium after the data has been migrated from the local storage medium to the remote storage medium;

storing attributes of the file at the local storage medium;

receiving a first access request that involves the file;

determining that a response to the first access request can be provided using only the attributes of the file stored at the local storage medium;

based on the determination that the response to the first access request can be provided using only the attributes of the file stored at the local storage medium, responding to the first access without recalling the data from the remote storage medium; then receiving a second access request that involves the file;

determining that a response to the second access request can be provided only by recalling the data from the remote storage medium; and responding to the second access request by recalling the data from the remote storage medium.

20. A method as recited in claim 19, further comprising, prior to the step of receiving the first access request, the step of receiving parameters that specify policies under which data is to be recalled from the remote storage medium to the local storage medium.

21. A method as recited in claim 19, wherein the step of responding to the second access request is conducted by recalling only a portion of all of the data of the file that has been migrated to the remote storage medium.

22. A method as recited in claim 19, further comprising the steps of.

storing the data of the file on the local storage medium; and migrating the data of the file from the local storage medium to the remote storage medium before the step of storing the data of the file on the remote storage medium.

23. A method as recited in claim 22, further comprising the step of receiving parameters specifying migration policies under which the data is migrated from the local storage medium to the remote storage medium.

24. A method as recited in claim 23, further comprising, prior to the step of migrating the data, the step of pre-migrating the data before the migration policies have been satisfied, such that the data exists at the local storage medium and also at the remote storage medium.

25. A computer-readable medium having computer executable instructions for implementing a method for selectively returning data of a file from a remote storage medium to a local storage medium in response to an access request for the data made after the data has been migrated from the local storage medium to the remote storage medium, said computer readable medium comprising:

means for storing the data of the file on the remote storage medium after the data has been migrated from the local storage medium to the remote storage medium;

means for storing attributes of the file at the local storage medium;

means for receiving an access request that involves the file;

means for determining whether a response to the access request can be provided using only the attributes of the file stored at the local storage medium;

means for responding to the access request without recalling the data from the remote storage medium if it has been determined that the response can be provided using only the attributes stored at the local storage medium; and means for responding to the access request by recalling the data from the remote storage medium if it has been determined that the response cannot be provided using only the attributes stored at the local storage medium.

26. A computer readable medium as recited in claim 25, further comprising means for receiving parameters from a system manager to specify policies used in returning the data from the remote storage medium to the local storage medium.

27. A computer-readable medium having computer executable instructions for implementing, in a system having access to both a local and a remote storage medium, wherein migration policies are used to migrate data from the local storage medium to the remote storage medium, a method of pre-migrating the data prior to fully migrating the data in a manner such that the data can be rapidly deleted from the local storage medium and migrated when migration policies associated with the data are satisfied, said computer readable medium comprising:

means for obtaining parameters that specify migration policies under which data is to be migrated from the local storage medium to the remote storage medium such that, when the data is migrated, the data exists at the remote storage medium and does not exist at the local storage medium;

means for identifying files, including a first file, that are stored on a local storage medium and that have not yet satisfied migration policies and are not yet eligible for migration from the local storage medium to the remote storage medium;

means for pre-migrating data stored in said first file to said remote storage medium even though the migration policies have not yet been satisfied, so that the pre-migrated data exists on said local storage medium and also exists on the remote storage medium prior to said first file satisfying the migration policies;

means for receiving a request to write incoming data to the local storage medium prior to said first file satisfying the migration policies, the local storage medium not having sufficient free space to store the incoming data without deleting data already stored at the local storage medium;

means for determining whether a second file that (1) contains other pre-migrated data, and (2) has satisfied the migration policies, exists on the local storage medium; and means for performing the steps of:
        if said second file exists, migrating said second file from the local storage medium to the remote storage medium so as to create said sufficient free space; and
        if said second file does not exist, migrating said first file from the local storage medium to said remote storage medium to create said sufficient free space notwithstanding said first file not yet satisfying the migration policies.

28. A computer-readable medium as recited in claim 27, further comprising means for journaling actions taken while pre-migrating data from said local storage medium to said remote storage medium so that if the pre-migration process is interrupted prior to completion, the process may be resumed without the need to redo actions already completed.

29. A computer-readable medium as recited in claim 27, further comprising means for tracking a migration state of files having data stored on said remote storage medium, said migration state taking on a value of pre-migrated if data stored on said remote storage medium is also stored on said local storage medium and said migration state taking on a value of migrated if data stored on said remote storage medium is not also stored on said local storage medium.

30. A computer-readable medium as recited in claim 27, further comprising means for determining whether an I/O request involving a particular file having data previously pre-migrated to said remote storage medium invalidates said pre-migration.

31. A computer-readable medium as recited in claim 27, further comprising means for freeing local storage by removing data from said local storage medium that has been pre-migrated to said remote storage medium.

32. A computer-readable medium as recited in claim 27, further comprising means for invalidating data that has been pre-migrated to said remote storage medium.

33. A computer-readable medium as recited in claim 27, further comprising means for recalling data migrated to said remote storage medium back to local storage medium in response to an access request for data migrated to remote storage medium.

\* \* \* \* \*

UNITED STATES PATENT AND TRADEMARK OFFICE
CERTIFICATE OF CORRECTION

PATENT NO.   : 6,269,382 B1
DATED        : July 31, 2001
INVENTOR(S)  : Luis Felipe Cabrara and Michael G. Lotz It is certified that error appears in the above-identified patent and that said Letters Patent is hereby corrected as shown below:

Column 5,
Line 29, delete [,] after "policy"
Line 30, change "which" to -- that --

Column 10,
Line 53, change "excempt" to -- exempt --
Line 60, before "of migrating" delete [IX]

Column 11,
Line 26, delete [.] after "that"
Line 67, delete [,] and insert -- . -- after "storage"

Column 12,
Line 21, delete [,] and insert -- . -- after "arrives"

Column 15,
Line 12, delete [,] and insert -- . -- after "significant"

Column 17,
Line 29, insert -- . -- after "itself"
Line 52, change "11 8" to -- 118 --

Column 18,
Line 56, insert -- . -- after "stored"

Column 22,
Line 60, change "Modem" to -- Modern --

Column 26,
Line 54, change "180(the" to -- 180, the --

Column 27,
Line 13, insert -- . -- after "invalidated"
Line 50, change "It" to -- it --

Column 28,
Line 28, change -- attributes -- to -- attribute --

Column 29,
Line 18, delete [,] and insert -- . -- after "technology"

UNITED STATES PATENT AND TRADEMARK OFFICE
CERTIFICATE OF CORRECTION

PATENT NO.   : 6,269,382 B1
DATED        : July 31, 2001
INVENTOR(S)  : Luis Felipe Cabrara and Michael G. Lotz It is certified that error appears in the above-identified patent and that said Letters Patent is hereby corrected as shown below:

<u>Column 32,</u>
Line 30, change "09/939,593" to -- 08/839,593 --
Line 34, change "attributed" to -- attribute --

<u>Column 33,</u>
Line 51, insert -- . After "necessary"

<u>Column 36,</u>
Line 26, change ":" to -- , -- after "medium"

Signed and Sealed this

Eighteenth Day of June, 2002

*Attest:*

*Attesting Officer*

JAMES E. ROGAN
*Director of the United States Patent and Trademark Office*